US012380904B2

(12) United States Patent
Kim et al.

(10) Patent No.: US 12,380,904 B2
(45) Date of Patent: Aug. 5, 2025

(54) SEAMLESS SCALABLE DECODING OF CHANNELS, OBJECTS, AND HOA AUDIO CONTENT

(71) Applicant: Apple Inc., Cupertino, CA (US)

(72) Inventors: Moo Young Kim, San Diego, CA (US); Dipanjan Sen, Dublin, CA (US); Eric Allamanche, Sunnyvale, CA (US); J. Kevin Calhoun, Santa Rosa, CA (US); Frank Baumgarte, Sunnyvale, CA (US); Sina Zamani, Cupertino, CA (US); Eric Day, San Jose, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 18/246,024

(22) PCT Filed: Sep. 10, 2021

(86) PCT No.: PCT/US2021/049744

§ 371 (c)(1),
(2) Date: Mar. 20, 2023

(87) PCT Pub. No.: WO2022/066426

PCT Pub. Date: Mar. 31, 2022

(65) Prior Publication Data

US 2023/0360660 A1 Nov. 9, 2023

Related U.S. Application Data

(60) Provisional application No. 63/083,794, filed on Sep. 25, 2020.

(51) Int. Cl.
*G10L 19/24* (2013.01)
*G10L 19/008* (2013.01)

(52) U.S. Cl.
CPC ............ *G10L 19/24* (2013.01); *G10L 19/008* (2013.01)

(58) Field of Classification Search
CPC .............................. G10L 19/24; G10L 19/008
See application file for complete search history.

(56) References Cited

U.S. PATENT DOCUMENTS

| | | | | |
|---|---|---|---|---|
| 11,972,769 B2 * | 4/2024 | Fersch | .................... | G06F 3/165 |
| 12,094,478 B2 * | 9/2024 | Fischer | .................. | G10L 19/24 |
| 2023/0360661 A1 * | 11/2023 | Sen | ........................ | H04S 7/302 |

FOREIGN PATENT DOCUMENTS

| | | | | |
|---|---|---|---|---|
| CN | 114097028 A * | 2/2022 | ........... | G10L 19/002 |
| EP | 3067886 A1 | 9/2016 | | |

(Continued)

OTHER PUBLICATIONS

PCT/US2021/049744,"PCT Notification Concerning Transmittal of International Preliminary Report on Patentability (Chapter I of the Patent Cooperation Treaty) and Written Opinion of the International Searching Authority", mailed Apr. 6, 2023, 15 pages.

*Primary Examiner* — David L Ton
(74) *Attorney, Agent, or Firm* — Aikin & Gallant, LLP

(57) ABSTRACT

Disclosed are methods and systems for decoding immersive audio content encoded by an adaptive number of scene elements for channels, audio objects, higher-order ambisonics (HOA), and/or other sound field representations. The decoded audio is rendered to the speaker configuration of a playback device. For bit streams that represent audio scenes with a different mixture of channels, objects, and/or HOA in consecutive frames, fade-in of the new frame and fade-out of the old frame may be performed. Crossfading between consecutive frames happen in the speaker layout after rendering, in the spatially decoded content type before rendering, or between the transport channels as the output of the baseline decoder but before spatial decoding and rendering.

(Continued)

Crossfading may use an immediate fade-in and fade-out frame (IFFF) for the transition frame or may use an overlap-add synthesis technique such as time-domain aliasing cancellation (TDAC) of MDCT.

20 Claims, 15 Drawing Sheets

(56) References Cited

FOREIGN PATENT DOCUMENTS

| | | | | | |
|---|---|---|---|---|---|
| EP | 3123470 | A1 | | 2/2017 | |
| FI | 109393 | B | * | 7/2002 | |
| JP | 7412367 | B2 | * | 1/2024 | ........... G10L 19/008 |
| WO | 2015176005 | A1 | | 11/2015 | |

* cited by examiner

SEAMLESS SCALABLE DECODING OF CHANNELS, OBJECTS, AND HOA AUDIO CONTENT

CROSS REFERENCE TO RELATED APPLICATIONS

This application claims the benefit of U.S. Provisional Application No. 63/083,794 filed on Sep. 25, 2020, the disclosure of which is incorporated herein by reference in its entirety.

FIELD

This disclosure relates to the field of audio communication; and more specifically, to digital signal processing methods designed to decode immersive audio content that have been encoded using adaptive spatial encoding techniques. Other aspects are also described.

BACKGROUND

Consumer electronic devices are providing digital audio coding and decoding capability of increasing complexity and performance. Traditionally, audio content is mostly produced, distributed and consumed using a two-channel stereo format that provides a left and a right audio channel. Recent market developments aim to provide a more immersive listener experience using richer audio formats that support multi-channel audio, object-based audio, and/or ambisonics, for example Dolby Atmos or MPEG-H.

Delivery of immersive audio content is associated with a need for larger bandwidth, i.e., increased data rate for streaming and download compared to that for stereo content. If bandwidth is limited, techniques are desired to reduce the audio data size while maintaining the best possible audio quality. A common bandwidth reduction approach in perceptual audio coding takes advantage of the perceptual properties of hearing to maintain the audio quality. For example, spatial encoders corresponding to different content types such as multi-channel audio, audio objects, higher-order ambisonics (HOA), or stereo format may enable bitrate-efficient encoding of the sound field using spatial parameters. To efficiently use the limited bandwidth, audio scenes of different complexities may be spatially encoded using different content types for transmission. However, decoding and rendering of audio scenes encoded using different content types may introduce spatial artifacts, such as when transitioning between rendered audio scenes encoded using content types of different spatial resolution. To deliver richer and more immersive audio content using limited bandwidth, more robust audio coding and decoding (codec) techniques are desired.

SUMMARY

Disclosed are aspects of a scalable decoder that decodes and renders immersive audio content represented using an adaptive number of elements of various content types. Audio scenes of the immersive audio content may be represented by an adaptive number of scene elements in one or more content types encoded by adaptive spatial coding and baseline coding techniques, and adaptive channel configurations to support the target bitrate of a transmission channel or user. For example, audio scenes may be represented by an adaptive number of scene elements for channels, objects, and/or higher-order ambisonics (HOA), etc. The HOA describes a sound field based on spherical harmonics. The different content types have different bandwidth requirements and correspondingly different audio quality when recreated at the decoder. Adaptive channel and object spatial encoding techniques may generate the adaptive number of channels and objects, and adaptive HOA spatial encoding or HOA compression techniques may generate the adaptive order of the HOA. The adaptation may be a function of the target bitrate that is associated with a desired quality, and an analysis that determines the priority of the channels, objects, and HOA. The target bitrate may change dynamically based on the channel condition or the bitrate requirement of one or more users. The priority decisions may be rendered based on the spatial saliency of the sound field components represented by the channels, objects, and HOA.

In one aspect, a scalable decoder may decode audio streams that represent audio scenes by an adaptive number of scene elements for channels, objects, HOA, and/or Stereo-based Immersive Coding (STIC). The scalable decoder may also render the decoded streams with a fixed speaker configuration. Crossfading of the rendered channels, objects, HOA, or stereo-based signals between consecutive frames may be performed for the same speaker layout. For example, frame-by-frame audio bit streams of channels/objects, HOA, and STIC encodings may be decoded with a channel/object spatial decoder, spatial HOA decoder, and STIC decoder, respectively. The decoded bit streams are rendered to the speaker configuration of a playback device. If the newly rendered frame contains a different mixture of channels, objects, HOA, and STIC signals from the previously rendered frame, the new frame may be faded-in and the old frame may be faded out for the same speaker-layout. In the overlapped period for crossfading, the same sound field may be represented by two different mixtures of channels, objects, HOA, and STIC signals.

In one aspect, at an audio decoder, bit streams that represent audio scenes with an adaptive number of scene elements for channels, objects, HOA, and/or STIC encodings are decoded. The audio decoder may perform the crossfading between channels, objects, HOA, and stereo-format signals in the channels, objects, HOA, and stereo-format. A mixer in the same playback device as the audio decoder or in another playback device may render the crossfaded channels, objects, HOA, and stereo-format signals based on their respective speaker layouts. In one aspect, the crossfaded output of the audio decoder and the time-synchronized channel, object, HOA, and STIC metadata may be transmitted to other playback devices where the PCM and metadata are given to the mixer. In one aspect, the crossfaded output of the audio decoder and the time-synchronized metadata may be compressed as bit streams and transmitted to other playback devices where the bit streams are decompressed and given to the mixer. In one aspect, output of the audio decoder may be stored as a file for future rendering.

In one aspect, at an audio decoder, bit streams that represent audio scenes with an adaptive number of scene elements for channels, objects, HOA, and/or or STIC encodings are decoded. A mixer in the same playback device may perform the crossfading between channels, objects, HOA, and stereo-format signals in the channels, objects, HOA, and stereo-format. The mixer may then render the crossfaded channels, objects, HOA, and stereo-format signals based on its speaker layout. In one aspect, output of the audio decoder may be the PCM channels and their time-synchronized channel, object, HOA, and STIC metadata. Output of the audio decoder may be compressed and transmitted to other playback devices for crossfading and rendering.

In one aspect, at an audio decoder, bit streams that represent audio scenes with an adaptive number of scene elements for channels, objects, HOA, and/or STIC encodings are decoded. Crossfading between previous and current frames may be performed between the transport channels at the output of the baseline decoder before the spatial decoding. A mixer in one or more devices may render the crossfaded channels, objects, HOA, and stereo-format signals based on their respective speaker layouts. In one aspect, output of the audio decoder may be the PCM channels and their time-synchronized channel, object, HOA, and STIC metadata.

In one aspect of the techniques for crossfading between channels, objects, HOA, and stereo-format signals if the current frame contains bit streams encoded with a different mixture of content types from that of the previous frame, the transition frame may start with a mixture of streams referred to as an immediate fade-in and fade-out frame (IFFF). The IFFF may contain not only bit streams of the current frame encoded with a mixture of channels, objects, HOA, and stereo-format signals for fade-in, but also the bit streams of the previous frame encoded with a different mixture of channels, objects, HOA, and stereo-format signals for fade-out. In one aspect, crossfading of streams using IFFF may be performed between the transport channels as the output of the baseline decoder, between the spatially decompressed signals as the output of the spatial decoder, or between the speaker signals as the output of the renderer.

In one aspect, crossfading of two streams may be performed using an overlap-add synthesis technique such as the one used by the modified discrete cosine transform (MDCT). Instead of using an IFFF for the transition frame, time-domain aliasing cancellation (TDAC) of MDCT may be used as an implicit fade-in fade-out frame for spatial blending of streams. In one aspect, implicit spatial blending of streams with TDAC of MDCT may be performed between the transport channels as the output of the baseline decoder before the spatial decoding.

In one aspect, a method for decoding audio content represented by an adaptive number of scene elements for different content types to perform crossfading of the content types is disclosed. The method includes receiving frames of the audio content. The audio content is represented by one or more content types such as channels, objects, HOA, stereo-based signals, etc. The frames contain audio streams that encode the audio content using an adaptive number of scene elements in the one or more content types. The method also includes processing two consecutive frames containing audio streams encoding a different mixture of the adaptive number of the scene element in the one or more content types to generate decoded audio streams for the two consecutive frames. The method further includes performing crossfading of the decoded audio streams in the two consecutive frames based on a speaker configuration to drive a plurality of speakers. In one aspect, the crossfaded outputs may be provided to headphones or used for applications such as binaural rendering.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
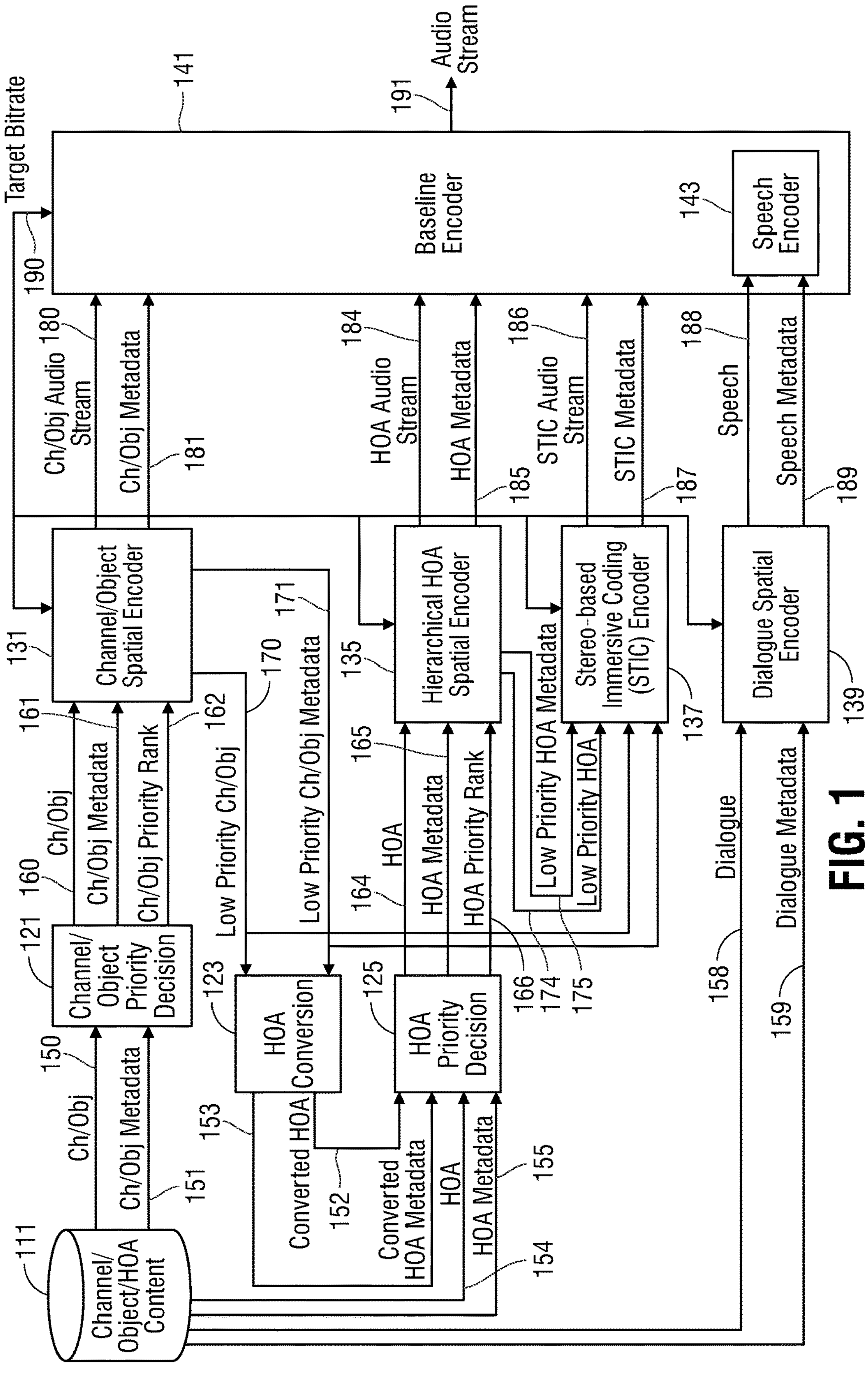
FIG. 1 is a functional block diagram of a hierarchical spatial resolution codec that adaptively adjusts the encoding of immersive audio content as the target bitrate changes according to one aspect of the disclosure.

It is desirable to provide immersive audio content over a transmission channel from an audio source to a playback system while maintaining the best possible audio quality. When the bandwidth of the transmission channel changes due to changing channel conditions or changing target bitrate of the playback system, encoding of the immersive audio content may be adapted to improve the trade-off between audio playback quality and the bandwidth. The immersive audio content may include multi-channel audio, audio objects, or spatial audio reconstructions known as ambisonics, which describe a sound field based on spherical harmonics that may be used to recreate the sound field for playback. Ambisonics may include first order or higher order spherical harmonics, also known as higher-order ambisonics (HOA). The immersive audio content may be adaptively encoded into audio content of different bitrates and spatial resolution as a function of the target bitrate and priority ranking of the channels, objects, and HOA. The adaptively encoded audio content and its metadata may be transmitted over the transmission channel to allow one or more decoders with changing target bitrates to reconstruct the immersive audio experience.

Systems and methods are disclosed for audio decoding techniques that decode immersive audio content encoded by an adaptive number of scene elements for channels, audio objects, HOA, and/or other sound field representation such as STIC encodings. The decoding techniques may render the decode audio to the speaker configuration of a playback device. For bit streams that represent audio scenes with a different mixture of channels, objects, HOA, or stereo-based signals received in consecutive frames, fade-in of the new frame and fade-out of the old frame may be performed. Crossfading between consecutive frames encoded with a different mixture of content types may happen between the transport channels as the output of the baseline decoder, between the spatially decompressed signals as the output of the spatial decoder, or between the speaker signals as the output of the renderer.

In one aspect, techniques for crossfading consecutive frames encoded with a different mixture of channels, objects, HOA, or stereo-based signals may use an immediate fade-in and fade-out frame (IFFF) for the transition frame. The IFFF may contain bit streams of the current frame for fade-in and bit streams of the previous frame for fade-out to eliminate redundant frames required for crossfading. In one aspect, crossfading may use an overlap-add synthesis technique such as time-domain aliasing cancellation (TDAC) of MDCT without an explicit IFFF. Advantageously, spatial blending of audio streams using the disclosed crossfading techniques may eliminate spatial artifacts associated with crossfading and may reduce the computational complexity, latency, and the number of decoders used for decoding immersive audio content encoded by an adaptive number of scene elements for channels, audio objects, and/or HOA.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the elements or features in use or operation in addition to the orientation depicted in the figures. For example, if a device containing multiple elements in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 is a functional block diagram of a hierarchical spatial resolution codec that adaptively adjusts the encoding of immersive audio content as the target bitrate changes according to one aspect of the disclosure. The immersive audio content 111 may include various immersive audio input formats, also referred to as sound field representations, such as multi-channel audio, audio objects, HOA, dialogue. In the case of a multi-channel input, M channels of a known input channel layout may be present, such as a 7.1.4 layout (7 loudspeakers in the median plane, 4 loudspeakers in the upper plane, 1 low-frequency effects (LFE) loudspeaker). It is understood that the HOA may also include first-order ambisonics (FOA). In the following description of the adaptive encoding techniques, audio objects may be treated similarly as channels, and for simplicity channels and objects may be grouped together in the operation of the hierarchical spatial resolution codec.

Audio scenes of the immersive audio content 111 may be represented by a number of channels/objects 150, HOA 154, and dialogue 158, accompanied by channel/object metadata 151, HOA metadata 155, and dialogue metadata 159, respectively. Metadata may be used to describe properties of the associated sound field such as the layout configuration or directional parameters of the associated channels, or locations, sizes, direction, or spatial image parameters of the associated objects or HOA to aid a renderer to achieve the desired source image or to recreate the perceived locations of dominant sounds. To allow the hierarchical spatial resolution codec to improve the trade-off between spatial resolution and the target bitrate, the channels/objects and the HOA may be ranked so that higher ranked channels/objects and HOA are spatially encoded to maintain a higher quality sound field representation while lower ranked channels/objects and HOA may be converted and spatially encoded into a lower quality sound field representation when the target bit-rate decreases.

A channel/object priority decision module 121 may receive the channels/objects 150 and channel/object metadata 151 of the audio scenes to provide priority ranking 162 of the channels/objects 150. In one aspect, the priority ranking 162 may be rendered based on the spatial saliency of the channels and objects, such as the position, direction, movement, density, etc., of the channels/objects 150. For example, channels/objects with greater movement near the perceived position of the dominant sound may be more spatially salient and thus may be ranked higher than channels/objects with less movement away from the perceived position of the dominant sound. To minimize the degradation to the overall audio quality of the channels/objects when the target bitrate is reduced, audio quality expressed as the spatial resolution of the higher ranked channels/objects may be maintained while that of the lower ranked channels/objects may be reduced. In one aspect, the channel/object metadata 151 may provide information to guide the channel/object priority decision module 121 in rendering the priority ranking 162. For example, the channel/object metadata 151 may contain priority metadata for ranking certain channels/objects 150 as provided through human input. In one aspect, the channels/objects 150 and channel/object metadata 151 may pass through the channel/object priority decision module 121 as channels/objects 160 and channel/object metadata 161, respectively.

A channel/object spatial encoder 131 may spatially encode the channels/objects 160 and the channel/object metadata 161 based on the channel/object priority ranking 162 and the target bitrate 190 to generate the channel/object audio stream 180 and the associated metadata 181. For example, for the highest target bitrate, all of the channels/objects 160 and the metadata 161 may be spatially encoded into the channel/object audio stream 180 and the channel/object metadata 181 to provide the highest audio quality of the resulting transport stream. The target bitrate may be determined by the channel condition of the transmission channel or the target bitrate of the decoding device. In one aspect, the channel/object spatial encoder 131 may transform the channels/objects 160 into the frequency domain to perform the spatial encoding. The number of frequency sub-bands and the quantization of the encoded parameters may be adjusted as a function of the target bitrate 190. In one aspect, the channel/object spatial encoder 131 may cluster channels/objects 160 and the metadata 161 to accommodate reduced target bitrate 190.

In one aspect, when the target bitrate 190 is reduced, the channels/objects 160 and the metadata 161 that have lower priority rank may be converted into another content type and spatially encoded with another encoder to generate a lower quality transport stream. The channel/object spatial encoder 131 may not encode these low ranked channels/objects that are output as low priority channels/objects 170 and associated metadata 171. An HOA conversion module 123 may convert the low priority channels/objects 170 and associated metadata 171 into HOA 152 and associated metadata 153. As the target bitrate 190 is progressively reduced, progressively more of the channels/objects 160 and the metadata 161 starting from the lowest of the priority rank 162 may be output as the low priority channels/object 170 and the associated metadata 171 to be converted into the HOA 152 and the associated metadata 153. The HOA 152 and the associated metadata 153 may be spatially encoded to generate a transport stream of lower quality compared to a transport stream that fully encodes all of the channels/objects 160 but has the advantage of requiring a lower bitrate and a lower transmission bandwidth.

There may be multiple levels of hierarchy for converting and encoding the channels/objects 160 into another content type to accommodate lower target bitrates. In one aspect, some of the low priority channels/objects 170 and associated metadata 171 may be encoded with parametric coding such as a stereo-based immersive coding (STIC) encoder 137. The STIC encoder 137 may render a two-channel stereo audio stream 186 from an immersive audio signal such as by down-mixing channels or rendering objects or HOA to a stereo signal. The STIC encoder 137 may also generate metadata 187 based on a perceptual model that derives parameters describing the perceived direction of dominant sounds. By converting and encoding some of the channels/objects into the stereo audio stream 186 instead of HOA, a further reduction in the bitrate may be accommodated, albeit at a lower quality transport stream. While the STIC encoder 137 is described as rendering channels, objects, or HOA into the two-channel stereo audio stream 186, the STIC encoder 137 is not thus limited and may render the channels, objects, or HOA into an audio stream of more than two channels.

In one aspect, at a medium target bitrate, some of the low priority channels/objects 170 with the lowest priority rank and their associated metadata 171 may be encoded into the stereo audio stream 186 and the associated metadata 187. The remaining low priority channel/object 170 with higher priority rank and their associated metadata may be converted into HOA 152 and associated metadata 153, which may be prioritized with other HOA 154 and associated metadata 155 from the immersive audio content 111 and encoded into an HOA audio stream 184 and the associated metadata 185. The remaining channels/objects 160 with the highest priority rank and their metadata are encoded into the channel/object audio stream 180 and the associated metadata 181. In one aspect, at the lowest target bitrate, all of the channels/objects 160 may be encoded into the stereo audio stream 186 and the associated metadata, leaving no encoded channels, objects, or HOA in the transport stream.

Similar to the channels/objects, the HOA may also be ranked so that higher ranked HOA are spatially encoded to maintain the higher quality sound field representation of the HOA while lower ranked HOA are rendered into a lower quality sound field representation such as a stereo signal. A HOA priority decision module 125 may receive the HOA 154 and the associated metadata 155 of the sound field representation of the audio scenes from the immersive audio content 111, as well as the converted HOA 152 that have been converted from the low priority channels/objects 170 and the associated metadata 153 to provide priority ranking 166 among the HOA. In one aspect, the priority ranking may be rendered based on the spatial saliency of the HOA, such as the position, direction, movement, density, etc., of the HOA. To minimize the degradation to the overall audio quality of the HOA when the target bitrate is reduced, audio quality of the higher ranked HOA may be maintained while that of the lower ranked HOA may be reduced. In one aspect, the HOA metadata 155 may provide information to guide the HOA priority decision module 125 in rendering the HOA priority ranking 166. The HOA priority decision module 125 may combine the HOA 154 from the immersive audio content 111 and the converted HOA 152 that have been converted from the low priority channels/objects 170 to generate the HOA 164, as well as combining the associated metadata of the combined HOA to generate the HOA metadata 165.

A hierarchical HOA spatial encoder 135 may spatially encode the HOA 164 and the HOA metadata 165 based on the HOA priority ranking 166 and the target bitrate 190 to generate the HOA audio stream 184 and the associated metadata 185. For example, for a high target bitrate, all of the HOA 164 and the HOA metadata 165 may be spatially encoded into the HOA audio stream 184 and the HOA metadata 184 to provide a high quality transport stream. In one aspect, the hierarchical HOA spatial encoder 135 may transform the HOA 164 into the frequency domain to perform the spatial encoding. The number of frequency sub-bands and the quantization of the encoded parameters may be adjusted as a function of the target bitrate 190. In one aspect, the hierarchical HOA spatial encoder 135 may cluster HOA 164 and the HOA metadata 165 to accommodate reduced target bitrate 190. In one aspect, the hierarchical HOA spatial encoder 135 may perform compression techniques to generate an adaptive order of the HOA 164.

In one aspect, when the target bitrate 190 is reduced, the HOA 164 and the metadata 165 that have lower priority rank may be encoded as a stereo signal. The hierarchical HOA spatial encoder 135 may not encode these low ranked HOA that are output as low priority HOA 174 and associated metadata 175. As the target bitrate 190 is progressively reduced, progressively more of the HOA 164 and the HOA metadata 165 starting from the lowest of the priority rank 166 may be output as the low priority HOA 174 and the associated metadata 175 to be encoded into the stereo audio stream 186 and the associated metadata 187. The stereo audio stream 186 and the associated metadata 187 requires a lower bitrate and a lower transmission bandwidth compared to a transport stream that fully encodes all of the HOA 164, albeit at a lower audio quality. Thus, as the target bitrate 190 is reduced, a transport stream for an audio scene may have a greater mix of a hierarchy of content types of lower audio quality. In one aspect, the hierarchical mix of the content types may be adaptively changed scene-by-scene, frame-by-frame, or packet-by-packet. Advantageously, the hierarchical spatial resolution codec adaptively adjusts the hierarchical encoding of the immersive audio content to generate a changing mix of channels, objects, HOA, and stereo-signals based on the target bitrate and the priority ranking of components of the sound field representation to improve the trade-off between audio quality and the target bitrate.

In one aspect, audio scenes of the immersive audio content 111 may contain dialogue 158 and associated metadata 159. A dialogue spatial encoder 139 may encode the dialogue 158 and the associated metadata 159 based on the target bitrate 190 to generate a stream of speech 188 and speech metadata 189. In one aspect, the dialogue spatial encoder 139 may encode the dialogue 158 into a speech stream 188 of two channels when the target bitrate 190 is high. When the target bitrate 190 is reduced, the dialogue 158 may be encoded into a speech stream 188 of one channel.

A baseline encoder 141 may encode the channel/object audio stream 180, HOA audio stream 184, and stereo audio stream 186 into an audio stream 191 based on the target bitrate 190. The baseline encoder 141 may use any known coding techniques. In one aspect, the baseline encoder 141 may adapt the rate and the quantization of the encoding to the target bitrate 190. A speech encoder 143 may separately encode the speech stream 188 for the audio stream 191. The channel/metadata 181, HOA metadata 185, stereo metadata 187, and the speech metadata 189 may be combined into a single transport channel of the audio stream 191. The audio stream 191 may be transmitted over a transmission channel to allow one or more decoders to reconstruct the immersive audio content 111.

Figure 2:
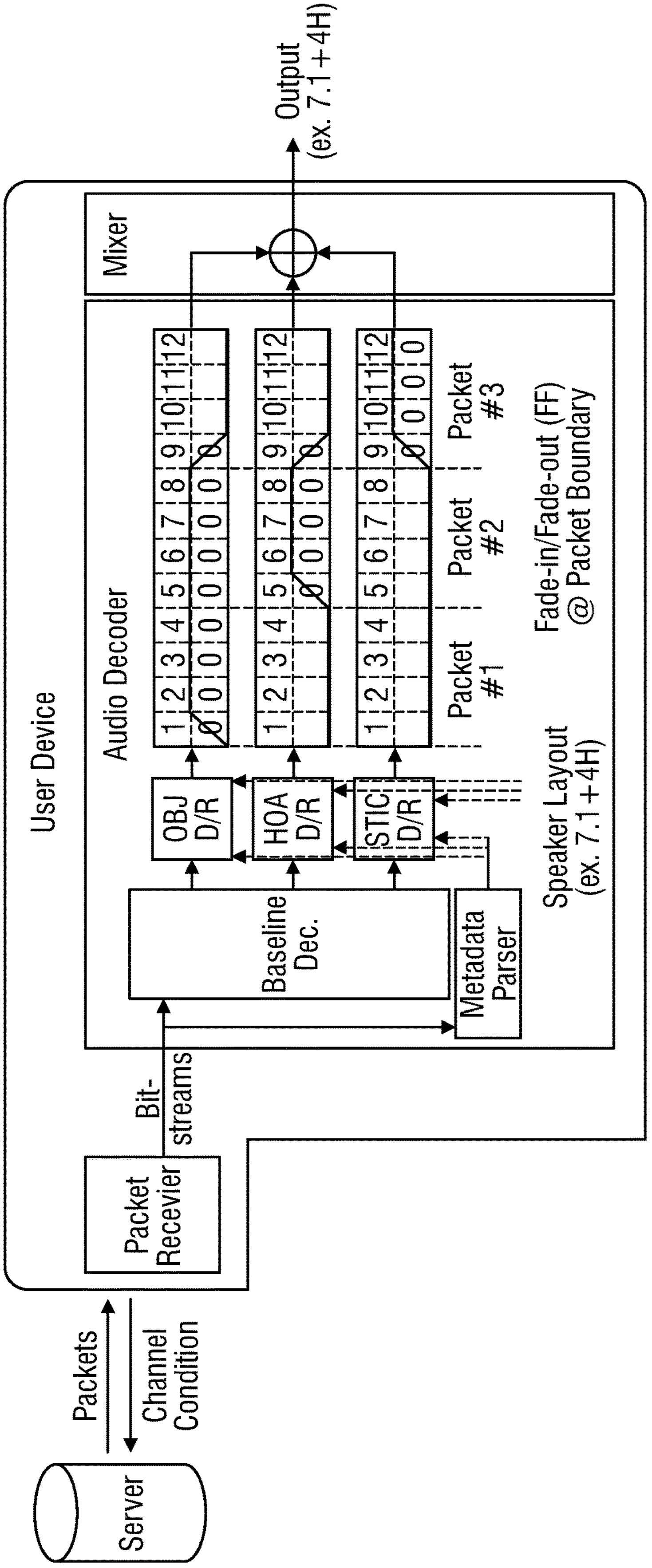
FIG. 2 depicts an audio decoding architecture that decodes and renders bit streams representing audio scenes with a different mixture of encoded content types based on a fixed speaker configuration so that crossfading of the bit streams between consecutive frames may be performed in the same speaker layout according to one aspect of the disclosure.

FIG. 2 depicts an audio decoding architecture that decodes and renders bit streams representing audio scenes with a different mixture of encoded content types based on a fixed speaker configuration so that crossfading of the bit streams between consecutive frames may be performed in the same speaker layout according to one aspect of the disclosure. Three packets are received by the packet receiver. Packets 1, 2, and 3 may contain bit streams encoded at 1000 kbps (16 objects), 512 kbps (4 objects+8 HOA), and 64 kbps (2 STIC), respectively. Frame-by-frame audio bit streams of channels/objects, HOA, and stereo-based parametric encoding may be decoded with a channel/object spatial decoder/renderer, spatial HOA decoder/renderer, and stereo decoder/renderer, respectively. The decoded bit streams may be rendered to the speaker configuration (e.g., 7.1.4 of a user device).

If a new packet contains a different mixture of channels, objects, HOA, and stereo-based signals from the previously packet, the new packet may be faded-in and the old packet may be faded out. In the overlapped period for crossfading, the same sound field may be represented by two different mixtures of channels, objects, HOA, and stereo-based signals. For example, at frame #9, the same audio scene is represented by either 4 objects+8 HOA or 2 STIC. The 4 objects+8 HOA of the old packet may be faded-out and the 2 STIC of the new packet may be faded-in in the 7.1.4 speaker domain.

Figure 3:
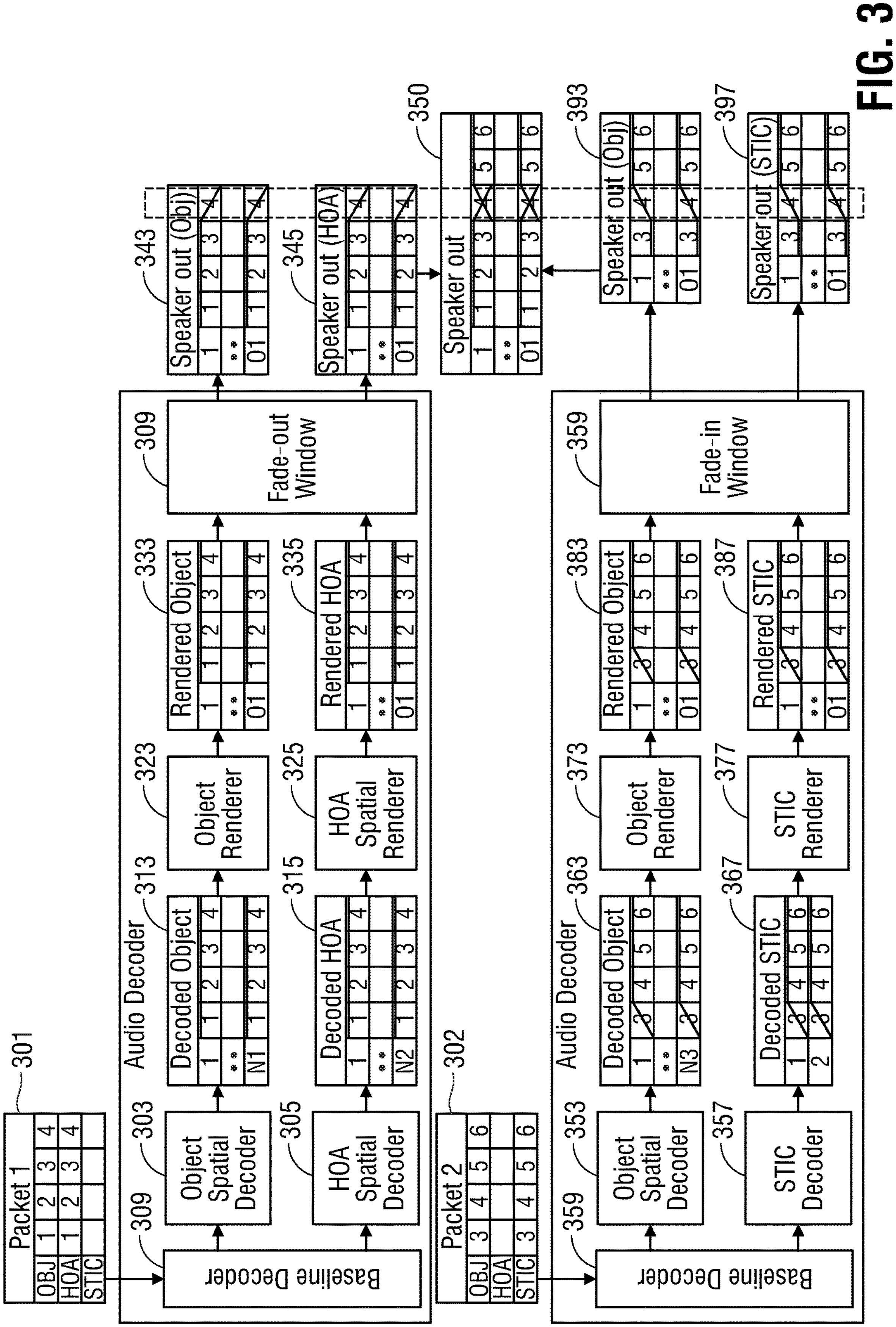
FIG. 3 depicts a functional block diagram of two audio decoders that implement the audio decoding architecture of FIG. 2 to perform spatial blending with redundant frames according to one aspect of the disclosure.

FIG. 3 depicts a functional block diagram of two audio decoders that implement the audio decoding architecture of FIG. 2 to perform spatial blending with redundant frames according to one aspect of the disclosure. Packet 1 (301) contains frames 1-4. Each frame in packet 1 includes a number of objects and HOA. Packet 2 (302) contains frames 3-6. Each frame in packet 2 includes a number of objects and STIC signals. The two packets contain bit streams that may represent one or more audio scenes encoded with an adaptive number of scene elements for channels, objects, HOA, and STIC encodings. The two packets contain overlapped and redundant frames 3-4 representing the overlapped period for crossfading. A baseline decoder 309 of a first audio decoder performs the baseline decoding of the bit streams in frames 1-4 of packet 1 (301). A baseline decoder 359 of a second audio decoder performs the baseline decoding of the bit streams in frames 3-6 of packet 2 (302).

An object spatial decoder 303 of the first audio decoder decodes the encoded objects in frames 1-4 of packet 1 (301) into an N1 number of decoded objects 313. An object renderer 323 in the first audio decoder renders the N1 decoded objects 313 into the speaker configuration (e.g., 7.1.4) of the first audio decoder. The rendered objects may be represented by the O1 number of speaker outputs 333.

An HOA spatial decoder 305 in the first audio decoder decodes the encoded HOA in frames 1-4 of packet 1 (301) into an N2 number of decoded HOA 315. An HOA renderer 325 in the first audio decoder renders the N2 decoded HOA 315 into the speaker configuration. The rendered HOA may be represented by the O1 number of speaker outputs 335. The rendered objects in the O1 number of speaker outputs 333 and the rendered HOA in the O1 number of speaker outputs 335 may be faded-out at frame 4 using a fade-out window 309 to generate a speaker output containing O1 objects 343 and O1 HOA 345.

Correspondingly, an object spatial decoder 353 of the second audio decoder decodes the encoded objects in frames 3-6 of packet 2 (302) into an N3 number of decoded objects 363. An object renderer 373 in the second audio decoder renders the N3 decoded objects 363 into the same speaker configuration as the same audio decoder. The rendered objects may be represented by the O1 number of speaker outputs 383.

A STIC decoder 357 in the second audio decoder decodes the encoded STIC signals in frames 3-6 of packet 2 (302) into decoded STIC signals 367. A STIC renderer 377 in the second audio decoder renders the decoded STIC signals 367 into the speaker configuration. The rendered STIC signals may be represented by the O1 number of speaker outputs 387. The rendered objects in the O1 number of speaker outputs 383 and the rendered STIC signals in the O1 number of speaker outputs 387 may be faded-in at frame 4 using a fade-in window 359 to generate a speaker output containing O1 objects 393 and O1 STIC signals 397. A mixer may mix the speaker output containing O1 objects 343 and O1 HOA 345 of frames 1-4 with the speaker output containing O1 objects 393 and O1 STIC signals 397 of frames 4-6 to generate the O1 speaker output 350 with the crossfading occurring at frame 4. Thus, the crossfading of objects, HOA, and STIC signals is performed in the same speaker layout.

Figure 4:
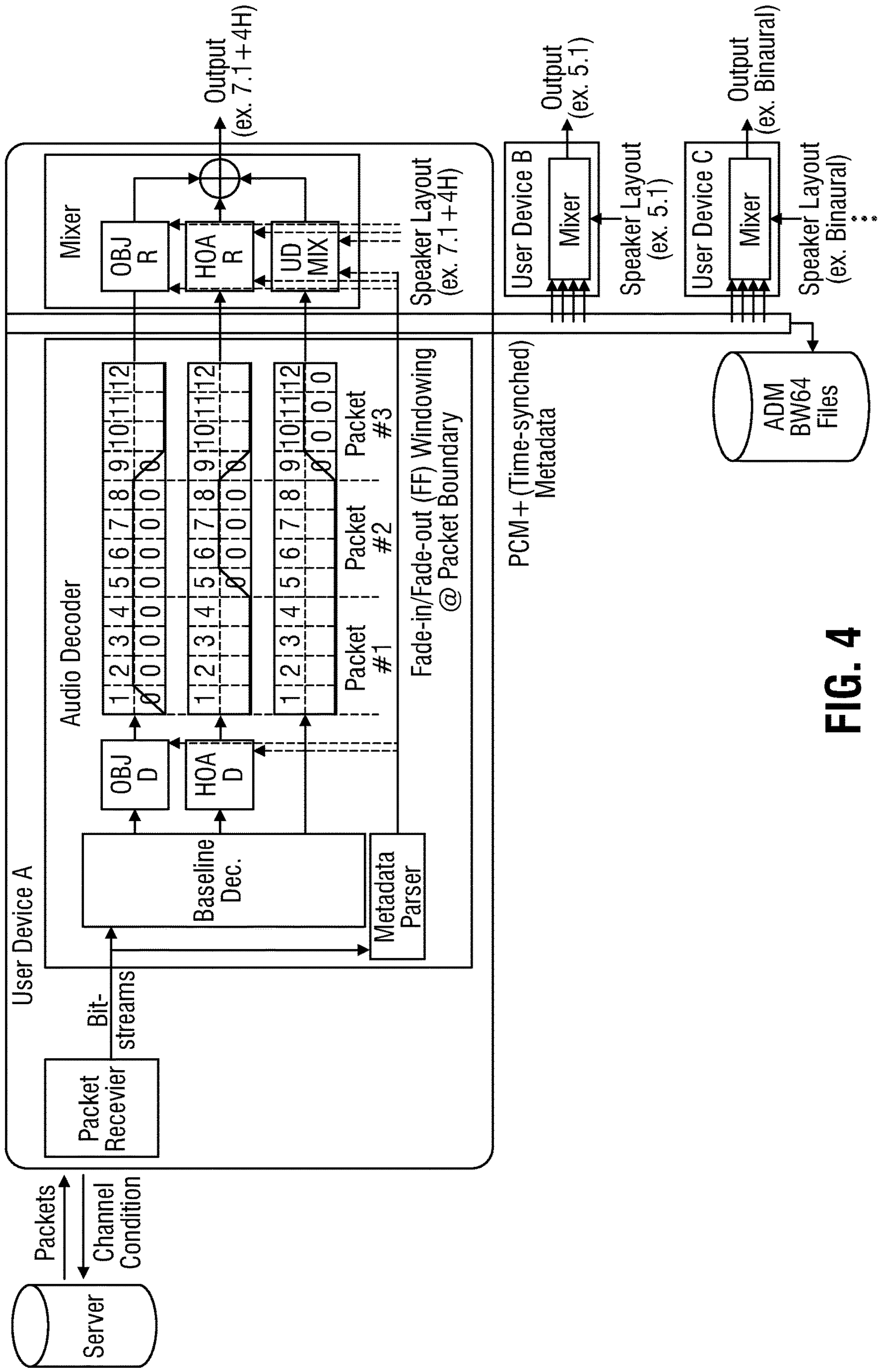
FIG. 4 depicts an audio decoding architecture that decodes bit streams representing audio scenes with a different mixture of encoded content types so that crossfading of the bit streams between consecutive frames may be performed in the channels, objects, HOA, and stereo-format signals in one device and the crossfaded output may be transmitted to multiple devices for rendering according to one aspect of the disclosure.

FIG. 4 depicts an audio decoding architecture that decodes bit streams representing audio scenes with a different mixture of encoded content types so that crossfading of the bit streams between consecutive frames may be performed in the channels, objects, HOA, and stereo-format signals in one device and the crossfaded output may be transmitted to multiple devices for rendering according to one aspect of the disclosure. Packets 1, 2, and 3 may contain the same encoded bit streams as in FIG. 2.

Frame-by-frame audio bit streams of channels/objects, HOA, and STIC signals may be decoded with the channel/object spatial decoder, spatial HOA decoder, and STIC decoder, respectively. For example, the spatial HOA decoder may decode spatially compressed representation of the HOA signals into HOA coefficients. The HOA coefficients may then be subsequently rendered. The decoded bit streams may be crossfaded at frame #9 of the spatially decoded channels/objects, HOA, and STIC signals before rendering. A mixer in the same playback device as the audio decoder or in another playback device may render the crossfaded channels/objects, HOA, and STIC signals based on their respective speaker layouts. In one aspect, the crossfaded output of the audio decoder may be compressed as bit streams and transmitted to other playback devices where the bit streams are decompressed and given to the mixer for rendering based on their respective speaker layouts. In one aspect, output of the audio decoder may be stored as a file for future rendering.

Figure 5:
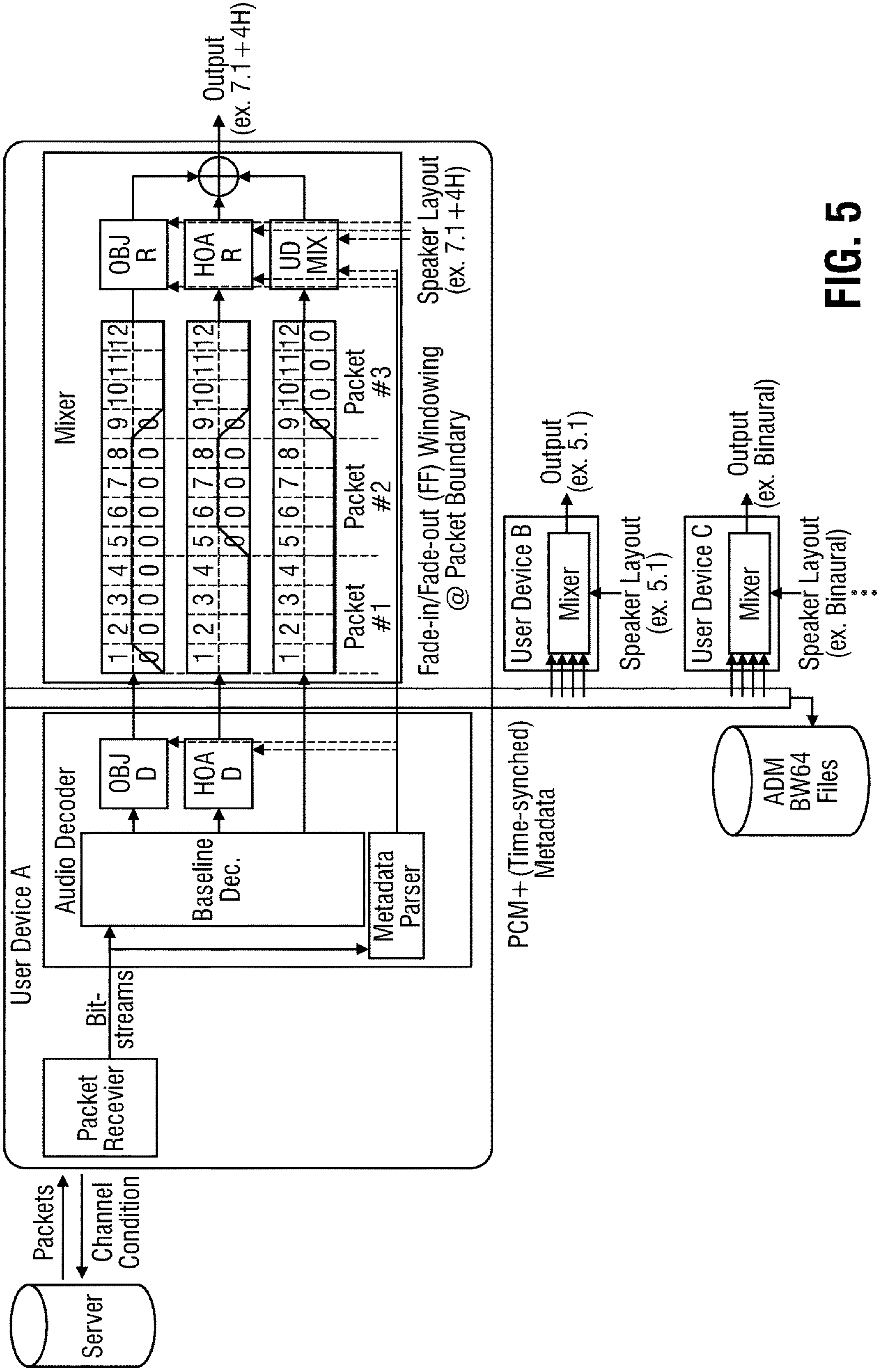
FIG. 5 depicts an audio decoding architecture that decodes bit streams representing audio scenes with a different mixture of encoded content types in one device and the decoded output may be transmitted to multiple devices for crossfading of the bit streams between consecutive frames in the channels, objects, HOA, and stereo-format signals and for rendering according to one aspect of the disclosure.

FIG. 5 depicts an audio decoding architecture that decodes bit streams representing audio scenes with a different mixture of encoded content types in one device and the decoded output may be transmitted to multiple devices for crossfading of the bit streams between consecutive frames in the channels, objects, HOA, and stereo-format signals and for rendering according to one aspect of the disclosure. Packets 1, 2, and 3 may contain the same encoded bit streams as in FIGS. 2 and 4.

Frame-by-frame audio bit streams of channels/objects, HOA, and STIC signals may be decoded with the channel/object spatial decoder, spatial HOA decoder, and STIC decoder, respectively. A mixer in the same playback device as the decoder may perform the crossfading between the spatially decompressed signals as the output of the spatial decoder before rendering. The mixer may then render the crossfaded channels, objects, HOA, and stereo-format signals based on the speaker layout. In one aspect, the output of the audio decoder may be compressed as bit streams and transmitted to other playback devices where the bit streams are decompressed and given to the mixer for crossfading and rendering based on their respective speaker layouts. In one aspect, output of the audio decoder may be stored as a file for future rendering.

Figure 6:
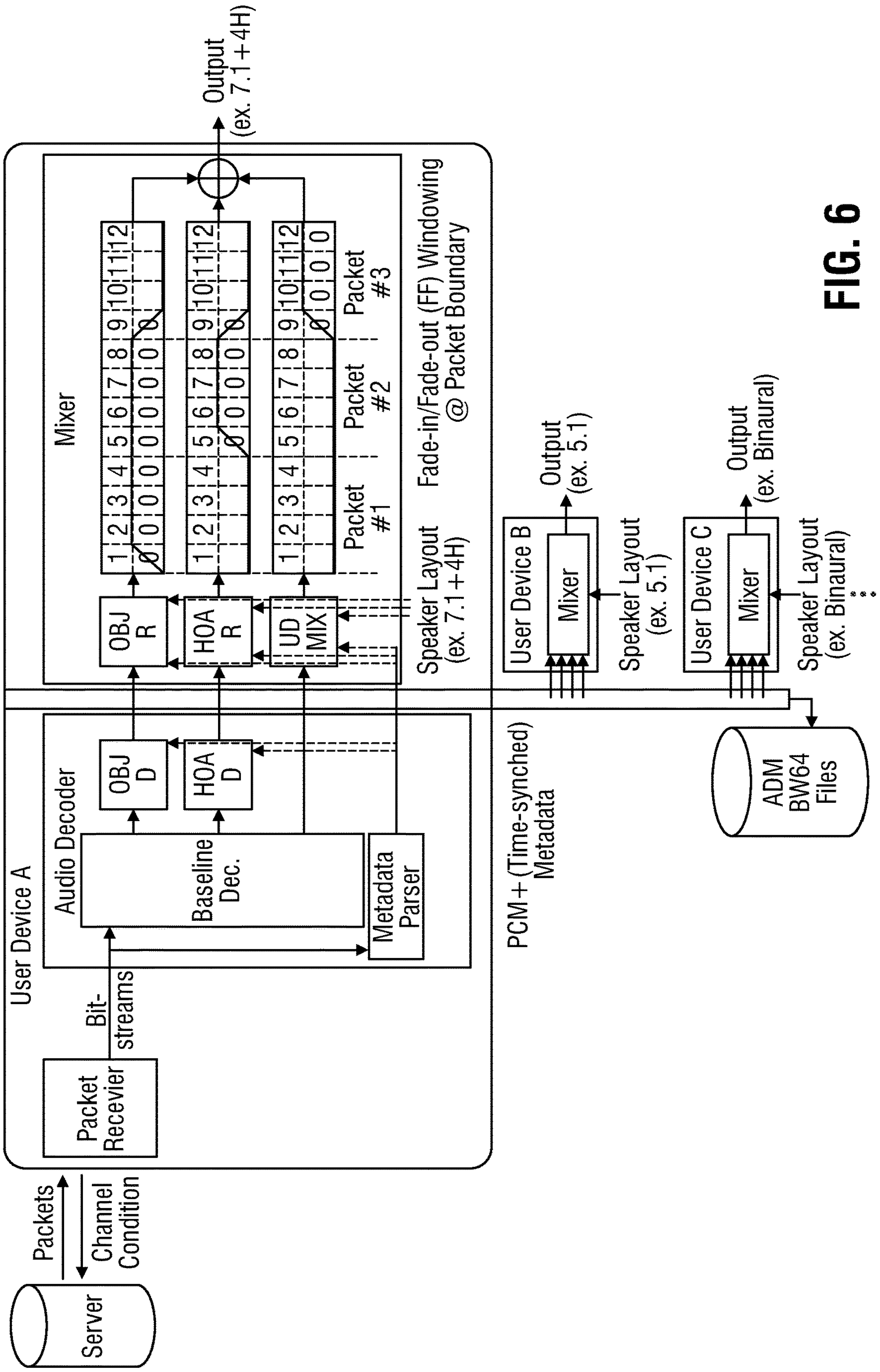
FIG. 6 depicts an audio decoding architecture that decodes bit streams representing audio scenes with a different mixture of encoded content types in one device and the decoded output may be transmitted to multiple devices for rendering and then crossfading of the bit streams between consecutive frames in the respective speaker layout of the multiple devices according to one aspect of the disclosure.

FIG. 6 depicts an audio decoding architecture that decodes bit streams representing audio scenes with a different mixture of encoded content types in one device and the decoded output may be transmitted to multiple devices for rendering and then crossfading of the bit streams between consecutive frames in the respective speaker layout of the multiple devices according to one aspect of the disclosure. Packets 1, 2, and 3 may contain the same encoded bit streams as in FIGS. 2, 4, and 5.

Frame-by-frame audio bit streams of channels/objects, HOA, and STIC signals may be decoded with the channel/object spatial decoder, spatial HOA decoder, and STIC decoder, respectively. A mixer in the same playback device as the decoder may render the decoded bit streams based on the speaker configuration. The mixer may perform the crossfading between the channels, objects, HOA, and STIC signals between the speaker signals. In one aspect, the output of the audio decoder may be compressed as bit streams and transmitted to other playback devices where the bit streams are decompressed and given to the mixer for rendering based on their respective speaker layouts and crossfading. In one aspect, output of the audio decoder may be stored as a file for future rendering.

Figure 7A:
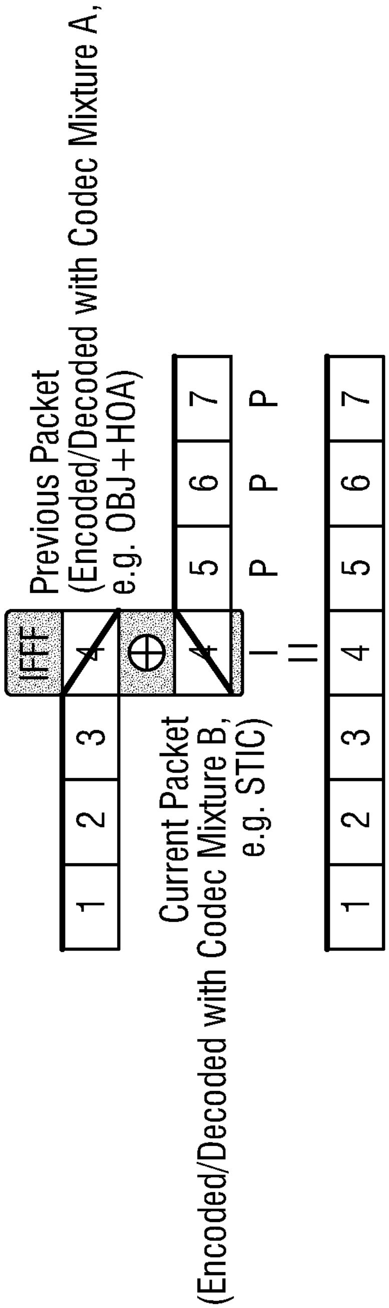
FIG. 7A depicts crossfading of two streams using an immediate fade-in and fade-out frame (IFFF) that contain not only bit streams of the current frame encoded with a mixture of channels, objects, HOA, and stereo-format signals for fade-in, but also the bit streams of the previous frame encoded with a different mixture of channels, objects, HOA, and stereo-format signals for fade-out in which the IFFF may be an independent frame according to one aspect of the disclosure.

FIG. 7A depicts crossfading of two streams using an immediate fade-in and fade-out frame (IFFF) that contain not only bit streams of the current frame encoded with a mixture of channels, objects, HOA, and stereo-format signals for fade-in, but also the bit streams of the previous frame encoded with a different mixture of channels, objects, HOA, and stereo-format signals for fade-out in which the IFFF may be an independent frame according to one aspect of the disclosure.

For immediate fade-in and fade-out of two different streams, the transition frame may start with the IFFF. The IFFF may contain bit streams of the current frame for fade-in and bit streams of the previous frame for fade-out to eliminate redundant frames for crossfading such as the overlapped and redundant frames used in FIG. 3. If the IFFF is encoded as an independent frame (I-frame), it may be decoded immediately. However, if it is encoded with predictive coding (P-frame), bit streams of the previous frames are required are decoding. In this case, the IFFF may contain these redundant previous frames starting with an I-frame.

Figure 7B:
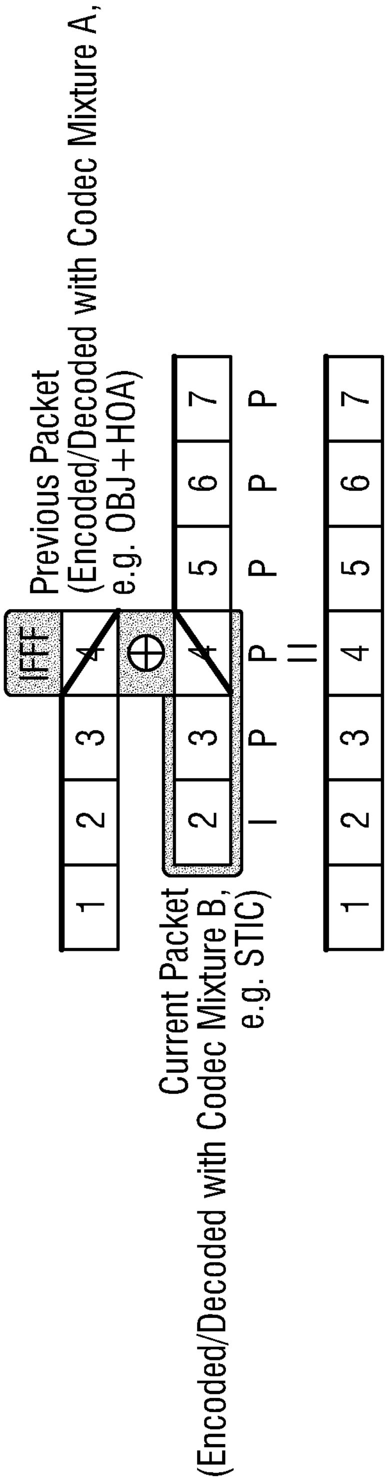
FIG. 7B depicts crossfading of two streams using an IFFF in which the IFFF may be a predictive coding frame according to one aspect of the disclosure.

FIG. 7B depicts crossfading of two streams using an IFFF in which the IFFF may be a predictive coding frame according to one aspect of the disclosure. The IFFF may contain redundant previous frames 2-3 starting with the I-frame in frame 2 because frame 3 is also a predictive coding frame.

Figure 8:
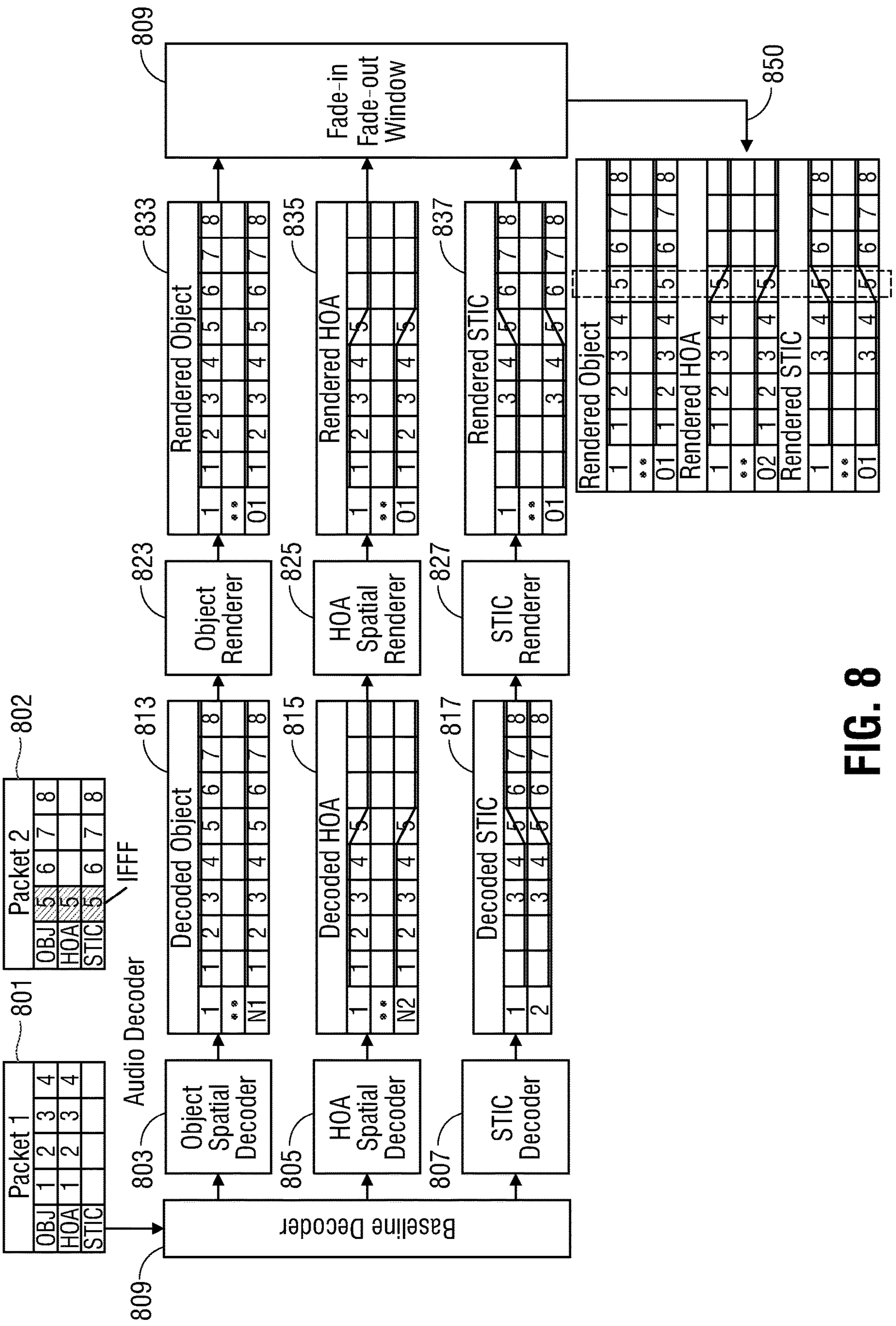
FIG. 8 depicts a functional block diagram of an audio decoder that implement the audio decoding architecture of FIG. 6 to perform spatial blending with IFFF according to one aspect of the disclosure.

FIG. 8 depicts a functional block diagram of an audio decoder that implement the audio decoding architecture of FIG. 6 to perform spatial blending with IFFF according to one aspect of the disclosure. Packet 1 (801) contains frames 1-4. Each frame in packet 1 (801) includes a number of objects and HOA. Packet 2 (802) contains frames 5-8. Each frame in packet 2 (802) includes a number of objects and STIC signals. The two packets contain bit streams that may represent one or more audio scenes encoded with an adaptive number of scene elements for channels, objects, HOA, and STIC encodings. The first frame of packet 2 (802) or frame 5 is an IFFF that represents the transition frame for crossfading. A baseline decoder 809 of the audio decoder performs the baseline decoding of the bit streams in both packets.

An object spatial decoder 803 of the audio decoder decodes the encoded objects in frames 1-4 of packet 1 (801) and frames 5-8 of packet 2 (802) into an N1 number of decoded objects 813. An object renderer 823 renders the N1 decoded objects 813 into the speaker configuration (e.g., 7.1.4) of the audio decoder. The rendered objects may be represented by the O1 number of speaker outputs 833.

An HOA spatial decoder 805 in the audio decoder decodes the encoded HOA in frames 1-4 of packet 1 (801) and the IFFF of packet 2 (802) into an N2 number of decoded HOA 815. An HOA renderer 825 renders the N2 decoded HOA 815 into the speaker configuration. The rendered HOA may be represented by the O1 number of speaker outputs 835.

A STIC decoder 807 in the audio decoder decodes the encoded STIC signals in the IFFF (frame 5) of packet 2 (802), and the remaining frames 6-8 of packet 2 (802) into decoded STIC signals 817. A STIC renderer 827 renders the decoded STIC signals 817 into the speaker configuration. The rendered STIC signals may be represented by the O1 number of speaker outputs 837. A fade-in fade-out window 809 performs crossfading of speaker outputs containing the O1 objects 833, O1 HOA 835, and O1 STIC signals 837 to generate the O1 speaker output 850 with the crossfading occurring at frame 5. Thus, the crossfading of objects, HOA, and STIC signals is performed in the same speaker layout.

Because the IFFF contains bit streams of the current frame for fade-in and bit streams of the previous frame for fade-out, it eliminates relying on redundant frames for crossfading such as the overlapped and redundant frames used in FIG. 3. Another advantage of using the IFFF for crossfading includes reduced latency and the capability to use only one audio decoder compared to the two audio decoders of FIG. 3. In one aspect, crossfading of objects, HOA, and STIC signals between consecutive frames using IFFF may be performed in the channels, objects, HOA, and stereo-format signals such as the audio decoding architectures depicted in FIGS. 4 and 5.

Figure 9A:
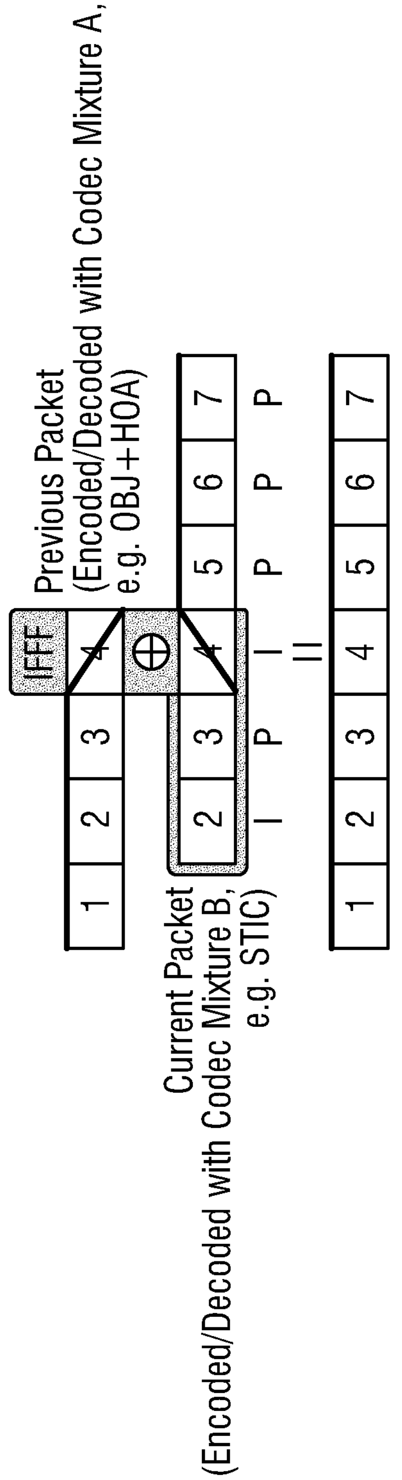
FIG. 9A depicts crossfading of two streams using an IFFF based an overlap-add synthesis technique such as time-domain aliasing cancellation (TDAC) of modified discrete cosine transform (MDCT) according to one aspect of the disclosure.

FIG. 9A depicts crossfading of two streams using an IFFF based an overlap-add synthesis technique such as time-domain aliasing cancellation (TDAC) of modified discrete cosine transform (MDCT) according to one aspect of the disclosure. For the fade-in of a new packet, if TDAC of MDCT is required, one more redundant frame is added in IFFF. For example, to obtain decoded audio output for frame 4, MDCT coefficients for frame 3 is required. However, because frame 3 is a P-frame, not only frame 3 but also frame 2, which is an I-frame, is added in IFFF.

Figure 9B:
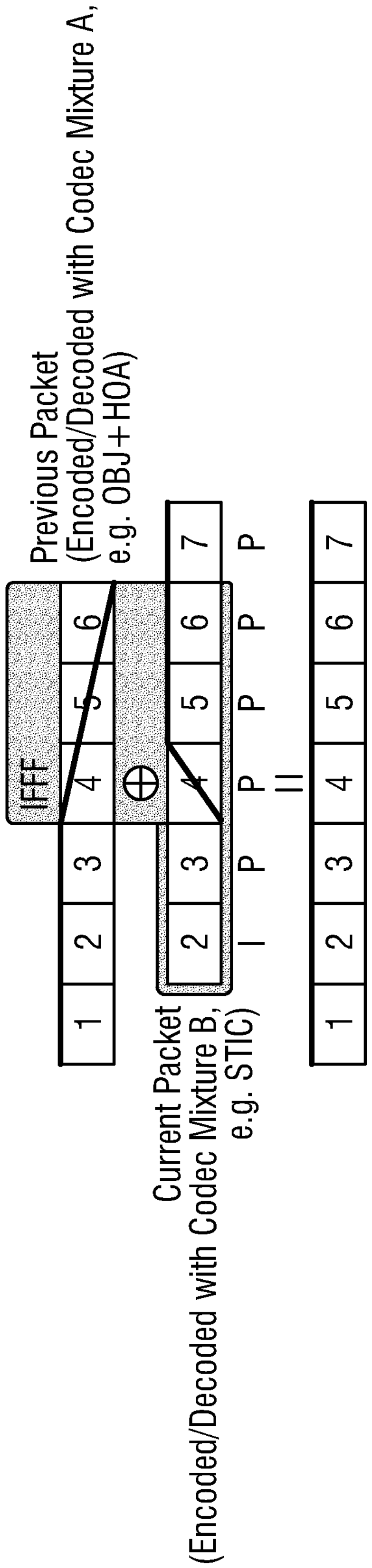
FIG. 9B depicts crossfading of two streams using an IFFF that spans over N frames of the two streams according to one aspect of the disclosure.

FIG. 9B depicts crossfading of two streams using an IFFF that spans over N frames of the two streams according to one aspect of the disclosure. If N frame are used for crossfading, bit streams representing the N frame of previous and current packets are contained in IFFF.

Figure 10:
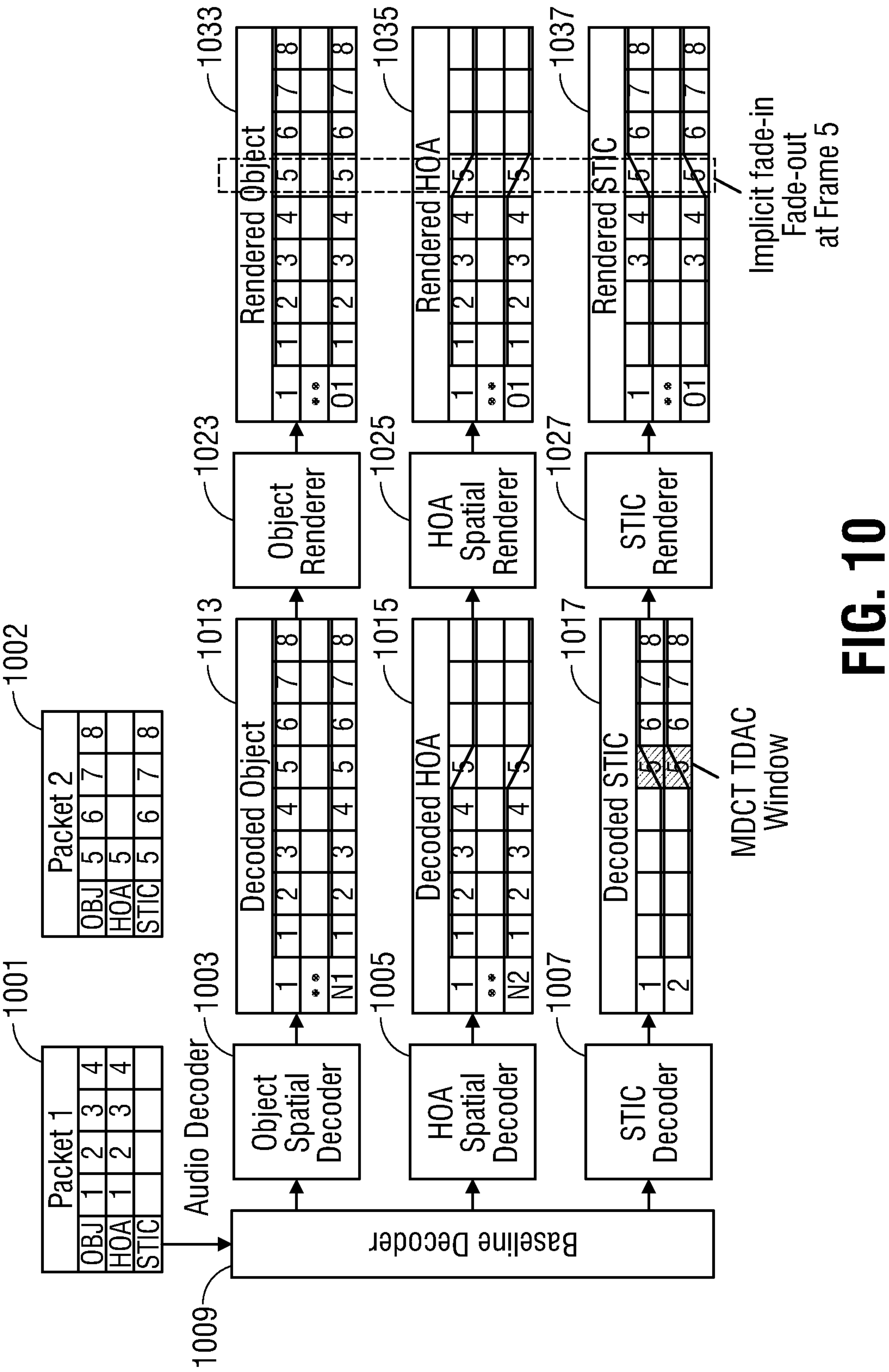
FIG. 10 depicts a functional block diagram of an audio decoder that implement the audio decoding architecture of FIG. 6 to perform implicit spatial blending with TDAC of MDCT according to one aspect of the disclosure.

FIG. 10 depicts a functional block diagram of an audio decoder that implement the audio decoding architecture of FIG. 6 to perform implicit spatial blending with TDAC of MDCT according to one aspect of the disclosure. Packet 1 (1001) contains frames 1-4. Each frame in packet 1 (1001) includes a number of objects and HOA. Packet 2 (1002) contains frames 5-8. Each frame in packet 2 (1002) includes a number of objects and STIC signals. The two packets contain bit streams that may represent one or more audio scenes encoded with an adaptive number of scene elements for channels, objects, HOA, and STIC encodings. The first frame of packet 2 (1002) or frame 5 is an implicit IFFF that represents the transition frame for crossfading based on TDAC of MDCT. A baseline decoder 1009 of the audio decoder performs the baseline decoding of the bit streams in both packets.

An object spatial decoder 1003 of the audio decoder decodes the encoded objects in frames 1-4 of packet 1 (1001) and frames 5-8 of packet 2 (1002) into an N1 number of decoded objects 1013. An object renderer 1023 renders the N1 decoded objects 1013 into the speaker configuration (e.g., 7.1.4) of the audio decoder. The rendered objects may be represented by the O1 number of speaker outputs 1033.

An HOA spatial decoder 1005 in the audio decoder decodes the encoded HOA in frames 1-4 of packet 1 (1001) and the implicit IFFF of packet 2 (1002) into an N2 number of decoded HOA 1015. An HOA renderer 1025 renders the N2 decoded HOA 1015 into the speaker configuration. The rendered HOA may be represented by the O1 number of speaker outputs 1035.

A STIC decoder 1007 in the audio decoder decodes the encoded STIC signals in frames 5-8 of packet 2 (802) into decoded STIC signals 1017. The STIC signal 1017 includes the MDCT TDAC window starting at frame 5. STIC renderer 1027 renders the decoded STIC signals 1017 into the speaker configuration. The rendered STIC signals may be represented by the O1 number of speaker outputs 1037. The implicit fade-in fade-out at frame 5 introduced by the MDCT TDAC performs crossfading of speaker outputs containing the O1 objects 1033, O1 HOA 1035, and O1 STIC signals 1037 to generate the O1 speaker output 1050 with the crossfading occurring at frame 5. Thus, the crossfading of objects, HOA, and STIC signals is performed in the same speaker layout. Advantages of using TDAC of MDCT as an implicit IFFF for crossfading includes eliminating relying on redundant frames for crossfading and the capability to use only one audio decoder compared to the two audio decoders of FIG. 3. Because the TDAC already introduces a windowing function, crossfading speaker output of current and future frames may be performed by simple addition without the need for an explicit fade-in fade-out window, thus reducing latency of audio decoding.

Figure 11:
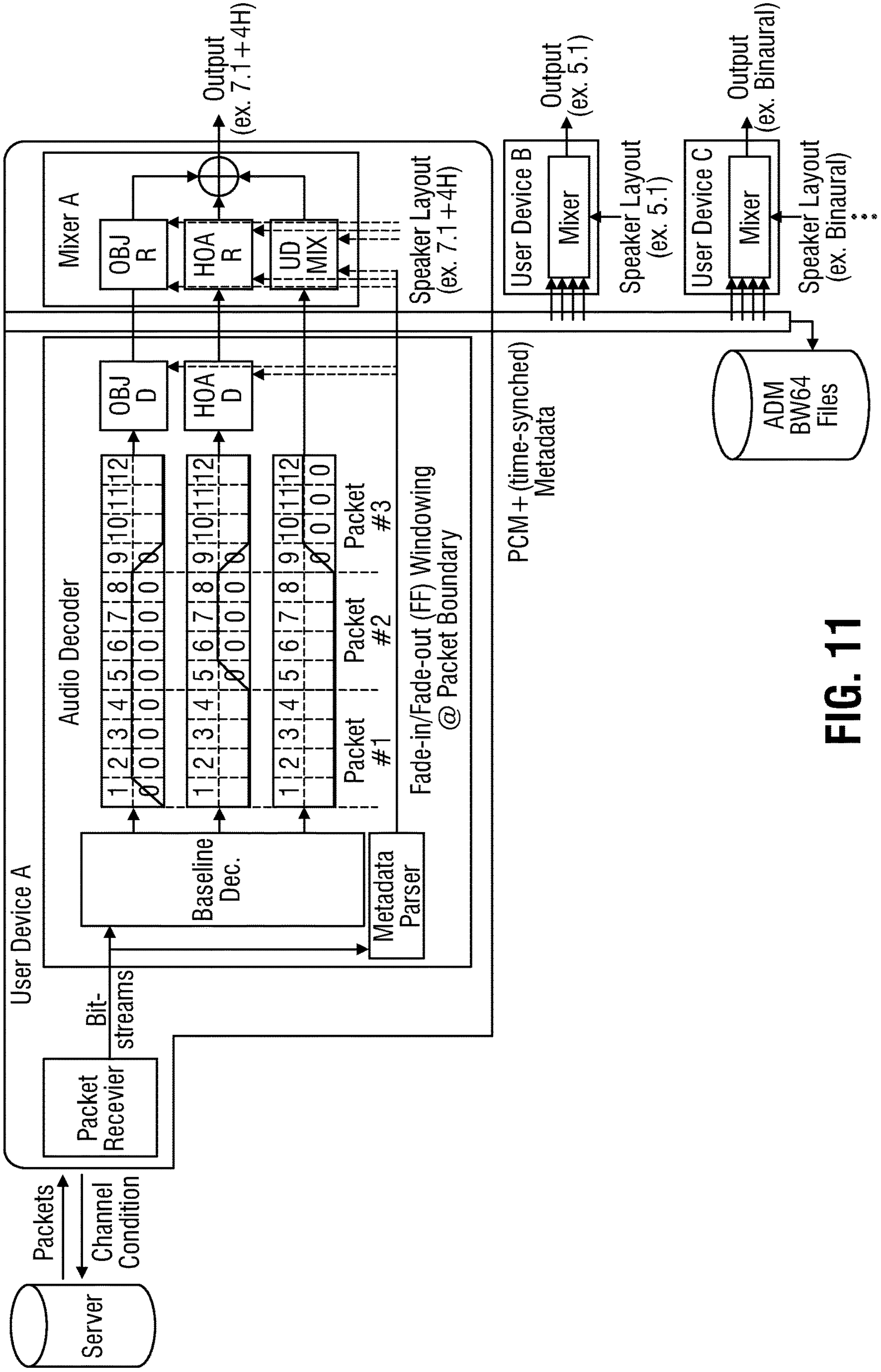
FIG. 11 depicts an audio decoding architecture that performs crossfading of the bit streams representing audio scenes with a different mixture of encoded content types between consecutive frames as the output of the baseline decoder before the spatial decoding so that the mixers in one or more devices may render the crossfaded channels, objects, HOA, and stereo-format signals based on their respective speaker layouts according to one aspect of the disclosure.

FIG. 11 depicts an audio decoding architecture that performs crossfading of the bit streams representing audio scenes with a different mixture of encoded content types between consecutive frames as the output of the baseline decoder before the spatial decoding so that the mixers in one or more devices may render the crossfaded channels, objects, HOA, and stereo-format signals based on their respective speaker layouts according to one aspect of the disclosure. Packets 1, 2, and 3 may contain the same encoded bit streams as in FIGS. 2, 4, and 5.

At an audio decoder, bit streams that represent audio scenes with an adaptive number of scene elements for channels, objects, HOA, and/or STIC encodings are decoded. Crossfading between previous and current frames may be performed between the transport channels as the output of the baseline decoder and before spatial decoding and rendering to reduce computational complexity. Channel/object spatial decoder, spatial HOA decoder, and STIC decoder, may spatially decode crossfaded channels/objects, HOA, and STIC signals respectively. A mixer may render the decoded and crossfaded bit streams based on the speaker configuration. In one aspect, the output of the audio decoder may be compressed as bit streams and transmitted to other playback devices where the bit streams are decompressed and given to the mixer for rendering based on their respective speaker layouts. In one aspect, output of the audio decoder may be stored as a file for future rendering. Performing crossfading of bit streams in consecutive frames between the transport channels as the output of the baseline decoder may be advantageous if the number of transport channels is low compared to the number of channels/object, HOA, and STIC signals after spatial decoding.

Figure 12:
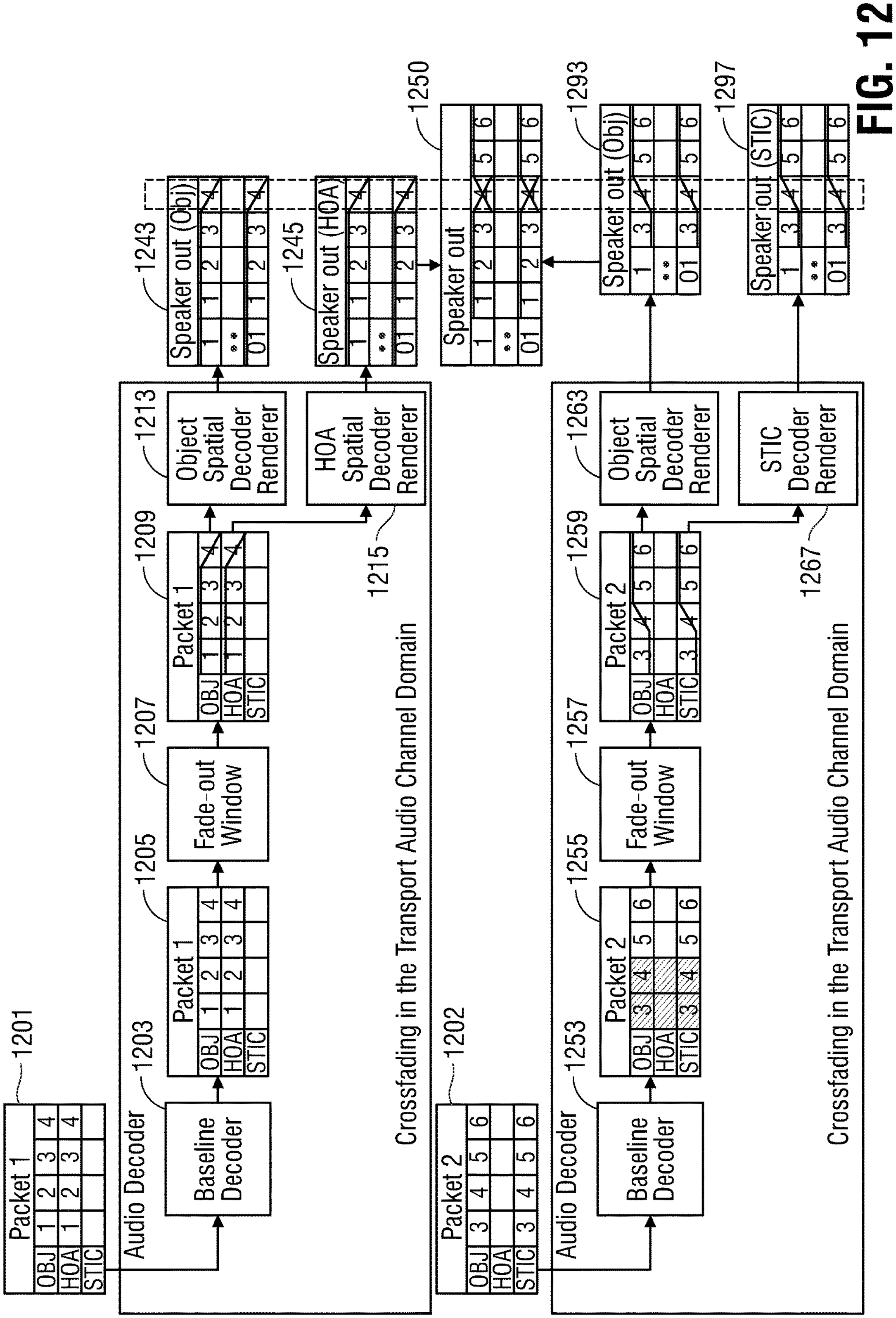
FIG. 12 depicts a functional block diagram of two audio decoders that implement the audio decoding architecture of FIG. 11 to perform spatial blending with redundant frames between the transport channels as the output of the baseline decoder according to one aspect of the disclosure.

FIG. 12 depicts a functional block diagram of two audio decoders that implement the audio decoding architecture of FIG. 11 to perform spatial blending with redundant frames between the transport channels as the output of the baseline decoder according to one aspect of the disclosure. Packet 1 (1201) contains frames 1-4. Each frame in packet 1 includes a number of objects and HOA. Packet 2 (1202) contains frames 3-6. Each frame in packet 2 includes a number of objects and STIC signals. The two packets contain bit streams that may represent one or more audio scenes encoded with an adaptive number of scene elements for channels, objects, HOA, and STIC encodings. The two packets contain overlapped and redundant frames 3-4 representing the overlapped period for crossfading.

A baseline decoder 1203 of a first audio decoder decodes packet 1 (1201) into a baseline decoded packet 1 (1205), which may be faded-out at frame 4 using a fade-out window 1207 to generate faded-out packet 1 (1209) between the transport channels as the output of the baseline decoder before spatial decoding and rendering. An object spatial decoder and renderer 1213 of the first audio decoder spatially decodes the encoded objects in faded-out packet 1 (1209) and renders the decoded objects into the speaker configuration (e.g., 7.1.4) of the first audio decoder. The rendered objects may be represented by the O1 number of speaker outputs 1243. An HOA spatial decoder and renderer 1215 of the first audio decoder spatially decodes the encoded HOA in faded-out packet 1 (1209) and renders the decoded HOA into the speaker configuration of the first audio decoder. The rendered HOA may be represented by the O1 number of speaker outputs 1245.

Correspondingly, a baseline decoder 1253 of a second audio decoder decodes packet 2 (1202) into a baseline decoded packet 2 (1255), which may be faded-out at frames 3 and 4 using a fade-out window 1257 to generate faded-out packet 2 (1259) between the transport channels as the output of the baseline decoder before spatial decoding and rendering. An object spatial decoder and renderer 1263 of the second audio decoder spatially decodes the encoded objects in faded-out packet 2 (1259) and renders the decoded objects into the same speaker configuration as the first audio decoder. The rendered objects may be represented by the O1 number of speaker outputs 1293. A STIC decoder and renderer 1267 of the second audio decoder spatially decodes the encoded STIC signals in faded-out packet 1 (1209) and renders the decoded STIC signals into the speaker configuration. The rendered STIC signals may be represented by the O1 number of speaker outputs 1297. A mixer may mix the speaker outputs containing O1 objects 1243 and O1 HOA 1245 of frames 1-4 with the speaker outputs containing O1 objects 1293 and O1 STIC signals 1297 of frames 4-6 to generate the O1 speaker output 1250 with the crossfading occurring at frame 4.

Figure 13:
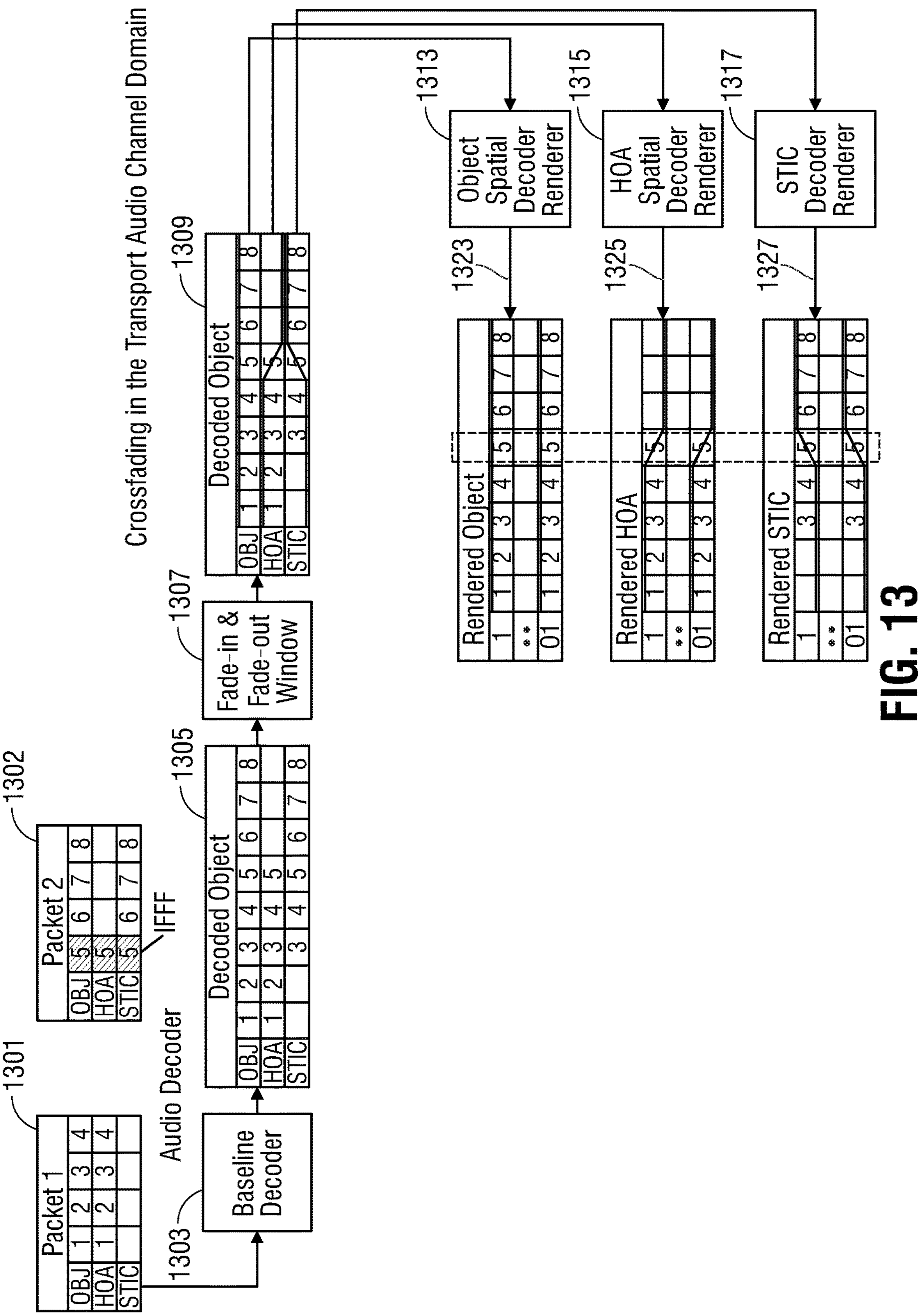
FIG. 13 depicts a functional block diagram of an audio decoder that implement the audio decoding architecture of FIG. 11 to perform spatial blending with IFFF between the transport channels as the output of the baseline decoder according to one aspect of the disclosure.

FIG. 13 depicts a functional block diagram of an audio decoder that implement the audio decoding architecture of FIG. 11 to perform spatial blending with IFFF between the transport channels as the output of the baseline decoder according to one aspect of the disclosure. Packet 1 (1301) contains frames 1-4. Each frame in packet 1 (1301) includes a number of objects and HOA. Packet 2 (1302) contains frames 5-8. Each frame in packet 2 (1302) includes a number of objects and STIC signals. The two packets contain bit streams that may represent one or more audio scenes encoded with an adaptive number of scene elements for channels, objects, HOA, and STIC encodings. The first frame of packet 2 (1302) or frame 5 is an IFFF that represents the transition frame for crossfading.

A baseline decoder 1303 of the audio decoder decodes packet 1 (1301) and packet 2 (1302) into a baseline decoded packet 1305. A fade-in fade-out window performs crossfading of the baseline decoded packet 1305 to generate crossfaded packet 1309 with the crossfading occurring at frame 5 between the transport channels as the output of the baseline decoder before spatial decoding and rendering. The STIC encoded signals in IFFF may contain the STIC encoded signals from frames 3 and 4 of packet 1 (1301) if the STIC signals in IFFF are encoded with a predictive frame.

An object spatial decoder and renderer 1313 of the audio decoder spatially decodes the encoded objects in crossfaded packet 1309 and renders the decoded objects into the speaker configuration (e.g., 7.1.4) of the audio decoder. The rendered objects may be represented by the O1 number of speaker outputs 1323. An HOA spatial decoder and renderer 1315 of the audio decoder spatially decodes the encoded HOA in crossfaded packet 1309 and renders the decoded HOA into the speaker configuration of the audio decoder.

The rendered HOA may be represented by the O1 number of speaker outputs 1325. A STIC decoder and renderer 1317 of the audio decoder spatially decodes the encoded STIC signals in crossfaded packet 1309 and renders the decoded STIC signals into the speaker configuration. The rendered STIC signals may be represented by the O1 number of speaker outputs 1327.

A mixer may mix the speaker outputs containing O1 objects 1323, O1 HOA 1325, and O1 STIC signals 1327 to generate O1 speaker output signals with the crossfading occurring at frame 5. Because the IFFF contains bit streams of the current frame for fade-in and bit streams of the previous frame for fade-out, it eliminates relying on redundant frames for crossfading such as the overlapped and redundant frames used in FIG. 12. Another advantage of using the IFFF for crossfading includes reduced latency and the capability to use only one audio decoder compared to the two audio decoders used in FIG. 12.

Figure 14:
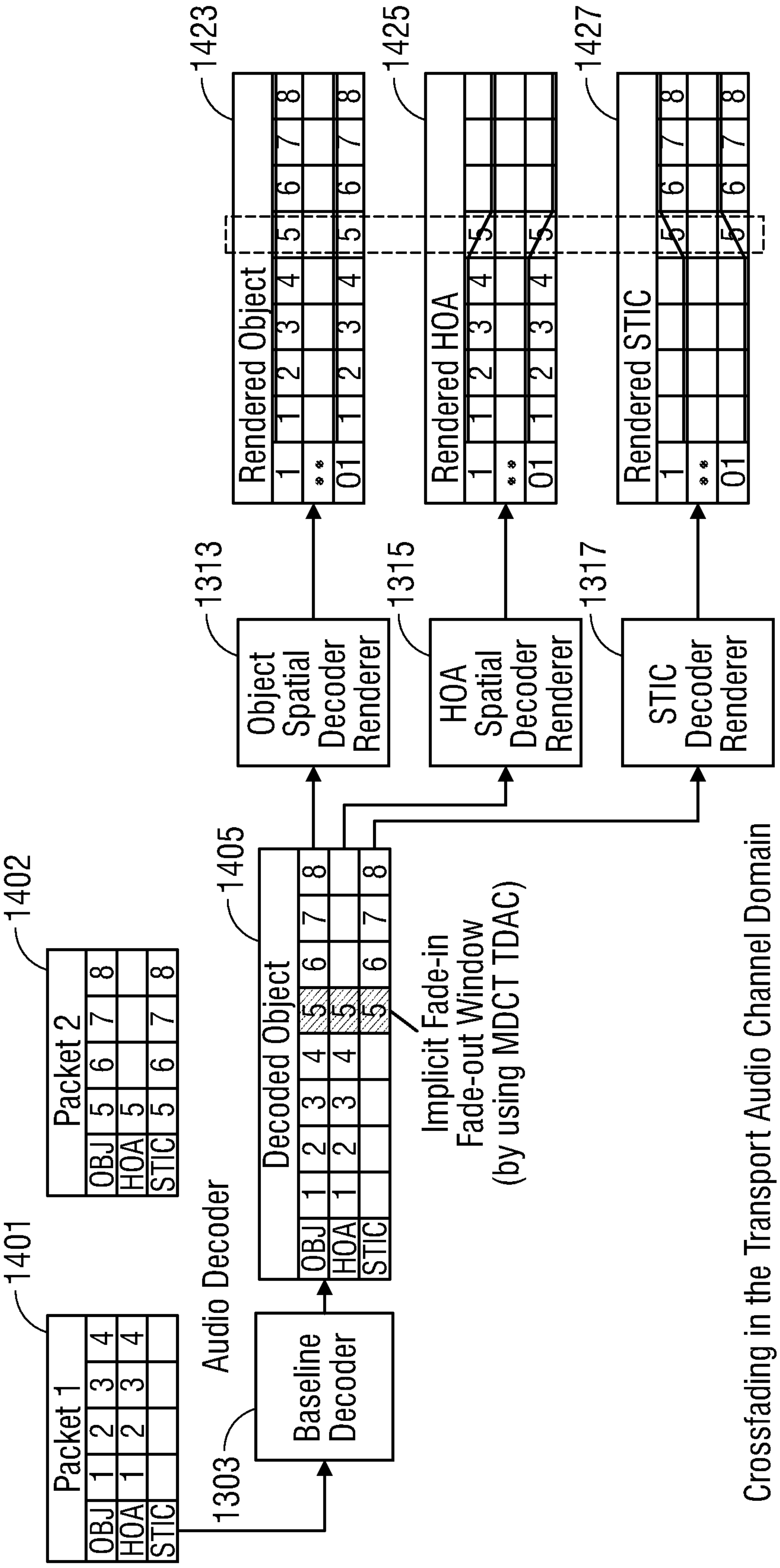
FIG. 14 depicts a functional block diagram of an audio decoder that implement the audio decoding architecture of FIG. 11 to perform implicit spatial blending with TDAC of MDCT between the transport channels as the output of the baseline decoder according to one aspect of the disclosure.

FIG. 14 depicts a functional block diagram of an audio decoder that implement the audio decoding architecture of FIG. 11 to perform implicit spatial blending with TDAC of MDCT between the transport channels as the output of the baseline decoder according to one aspect of the disclosure. Packet 1 (1401) contains frames 1-4. Each frame in packet 1 (1401) includes a number of objects and HOA. Packet 2 (1402) contains frames 5-8. Each frame in packet 2 (1402) includes a number of objects and STIC signals. The two packets contain bit streams that may represent one or more audio scenes encoded with an adaptive number of scene elements for channels, objects, HOA, and STIC encodings. The first frame of packet 2 (1402) or frame 5 is an implicit IFFF that represents the transition frame for crossfading based on TDAC of MDCT.

A baseline decoder 1303 of the audio decoder decodes packet 1 (1401) and packet 2 (1402) into a baseline decoded packet 1405. The implicit IFFF in frame 5 of the baseline decoded packet 1405 introduced by TDAC of MDCT causes the audio decoder to perform crossfading of the baseline decoded packet 1405 between the transport channels as the output of the baseline decoder before spatial decoding and rendering with the crossfading occurring at frame 5.

An object spatial decoder and renderer 1313 of the audio decoder spatially decodes the encoded objects in crossfaded packet 1405 and renders the decoded objects into the speaker configuration (e.g., 7.1.4) of the audio decoder. The rendered objects may be represented by the O1 number of speaker outputs 1423. An HOA spatial decoder and renderer 1315 of the audio decoder spatially decodes the encoded HOA in crossfaded packet 1405 and renders the decoded HOA into the speaker configuration of the audio decoder. The rendered HOA may be represented by the O1 number of speaker outputs 1425. A STIC decoder and renderer 1317 of the audio decoder spatially decodes the encoded STIC signals in crossfaded packet 1405 and renders the decoded STIC signals into the speaker configuration. The rendered STIC signals may be represented by the O1 number of speaker outputs 1427.

A mixer may mix the speaker outputs containing O1 objects 1423, O1 HOA 1425, and O1 STIC signals 1427 to generate O1 speaker output signals with the crossfading occurring at frame 5. Advantages of using TDAC of MDCT as an implicit IFFF for crossfading includes eliminating relying on redundant frames for crossfading and the capability to use only one audio decoder compared to the two audio decoders of FIG. 12. Because the TDAC already introduces a windowing function, crossfading speaker output of current and future frames may be performed by simple addition without the need for an explicit fade-in fade-out window, thus reducing latency of audio decoding.

Figure 15:
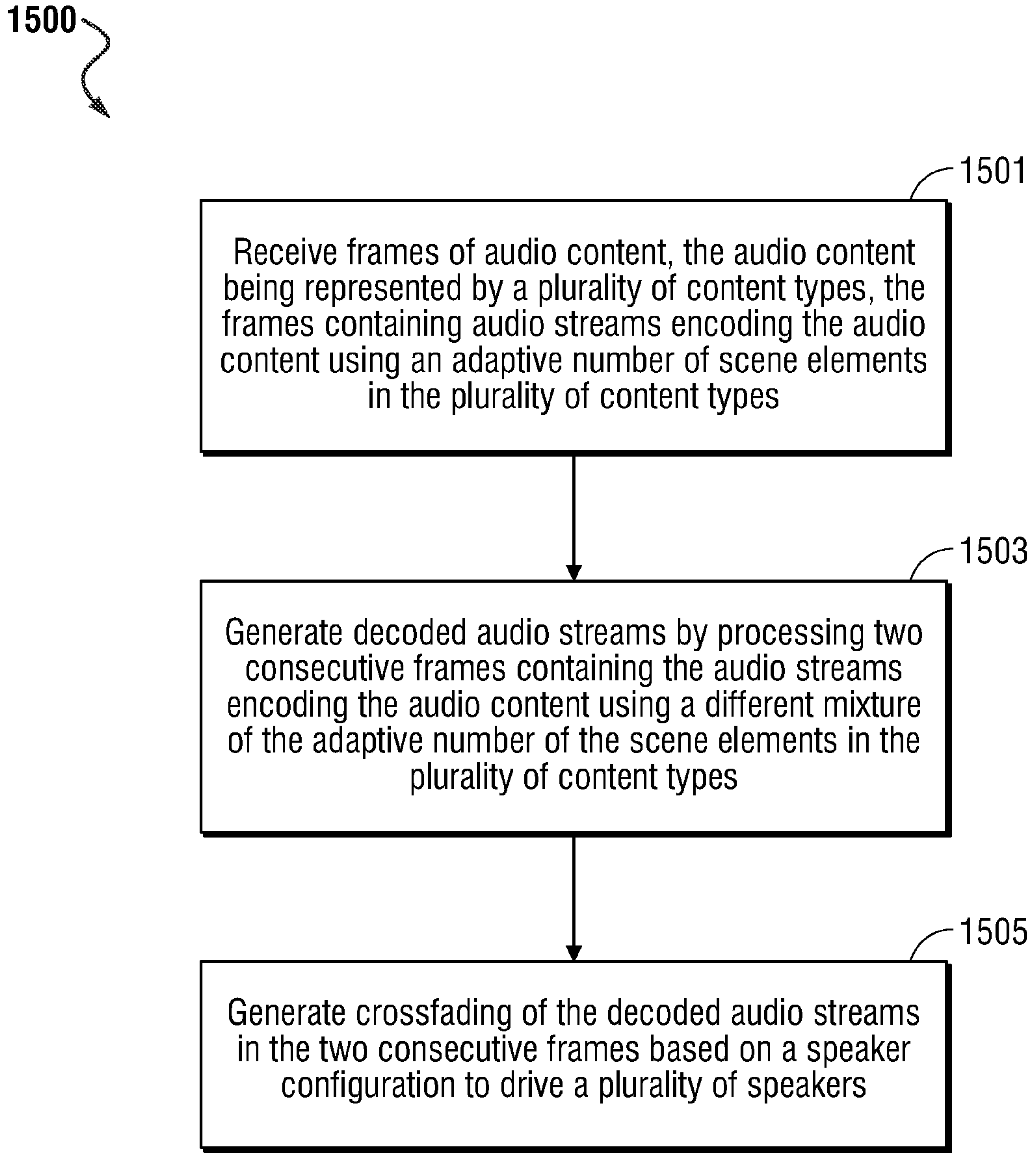
FIG. 15 is a flow diagram of a method of decoding audio streams that represent audio scenes by an adaptive number of scene element for different content types to perform crossfading of the content types in the audio streams according to one aspect of the disclosure.

FIG. 15 is a flow diagram of a method 1500 of decoding audio streams that represent audio scenes by an adaptive number of scene elements for different content types to perform crossfading of the content types in the audio streams according to one aspect of the disclosure. Method 1500 may be practiced by the decoders of FIG. 2, 3, 4, 5, 6, 8, 10, 11, 12, 13, or 14.

In operation 1501, the method 1500 receives frames of audio content. The audio content is represented by one or more content types such as channels, objects, HOA, stereo-based signals, etc. The frames contain audio streams that encode the audio content using an adaptive number of scene elements in the one or more content types. For example, the frames may contain audio streams encoding an adaptive number of scene elements for channels/objects, HOA, and/or STIC encodings.

In operation 1503, the method 1500 processes two consecutive frames containing audio streams encoding the audio content using a different mixture of the adaptive number of the scene element in the one or more content types to generate decoded audio streams for the two consecutive frames.

In operation 1505, the method 1500 generates crossfading of the decoded audio streams in the two consecutive frames based on a speaker configuration to drive a plurality of speakers. For example, the decoded audio streams of an old frame of the two consecutive frames may be faded-in and the decoded audio streams of a new frame of the two consecutive frames may be faded-in so that the crossfaded content types may be mixed to generate speaker output signals based on the same speaker configuration. In one aspect, the crossfaded outputs may be provided to headphones or used for applications such as binaural rendering.

Embodiments of the scalable decoder described herein may be implemented in a data processing system, for example, by a network computer, network server, tablet computer, smartphone, laptop computer, desktop computer, other consumer electronic devices or other data processing systems. In particular, the operations described for decoding and crossfading bit streams that represent audio scenes by an adaptive number of scene element for channels, objects, HOA, and/or STIC encodings are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words “means for” or “step for” are explicitly used in the particular claim.

What is claimed is:

1. A method of decoding audio content, the method comprising:
- receiving, by a decoding device, frames of the audio content, the audio content being represented by a plurality of content types, the frames containing audio streams encoding the audio content using an adaptive number of scene elements in the plurality of content types;
- generating decoded audio streams by processing two consecutive frames containing the audio streams encoding the audio content using a different mixture of the adaptive number of the scene elements in the plurality of content types; and
- generating crossfading of the decoded audio streams in the two consecutive frames based on a speaker configuration of the decoding device to drive a plurality of speakers.

2. The method of claim 1, wherein generating the decoded audio streams comprises:
- generating spatially decoded audio streams for the plurality of content types having at least one scene element for each of the two consecutive frames; and
- rendering the spatially decoded audio streams for the plurality of content types to generate speaker output signals for the plurality of content types for each of the two consecutive frames based on the speaker configuration of the decoding device;

and
- wherein generating the crossfading of the decoded audio streams comprises:
- generating crossfading of the speaker output signals for the plurality of content types from an earlier frame to a later frame of the two consecutive frames; and
- mixing the crossfading of the speaker output signals for the plurality of content types to drive the plurality of speakers.

3. The method of claim 2, further comprising:
- transmitting the spatially decoded audio streams and time-synchronized metadata for the plurality of content types to a second device for rendering based on a speaker configuration of the second device.

4. The method of claim 1, wherein generating the decoded audio streams comprises:
- generating spatially decoded audio streams for the plurality of content types having at least one scene elements for each of the two consecutive frames, and
- wherein generating the crossfading of the decoded audio streams comprises:
- generating crossfading of the spatially decoded audio streams for the plurality of content types from an earlier frame to a later frame of the two consecutive frames;
- rendering the crossfading of the spatially decoded audio streams for the plurality of content types to generate speaker output signals for the plurality of content types based on the speaker configuration of the decoding device; and
- mixing the speaker output signals for the plurality of content types to drive the plurality of speakers.

5. The method of claim 4, further comprising:
- transmitting the crossfading of the spatially decoded audio streams and time-synchronized metadata for the plurality of content types to a second device for rendering based on a speaker configuration of the second device.

6. The method of claim 4, further comprising:
- transmitting the spatially decoded audio streams and time-synchronized metadata for the plurality of content types to a second device for crossfading and rendering based on a speaker configuration of the second device.

7. The method of claim 1, wherein a later frame of the two consecutive frames comprises an immediate fade-in and fade-out frame (IFFF) used for generating the crossfading of the decoded audio streams, wherein the IFFF contains bit streams that encode the audio content of the later frame for immediate fade-in and encode the audio content of an earlier frame of the two consecutive frames for immediate fade-out.

8. The method of claim 7, wherein generating the decoded audio streams comprises:
- generating decoded audio streams for the plurality of content types having at least one scene elements for each of the two consecutive frames, wherein the decoded audio streams for the two consecutive frames have a different mixture of the adaptive number of the scene elements in the plurality of content types, and
- wherein generating the crossfading of the decoded audio streams in the two consecutive frames comprise:
- generating a transition frame based on the IFFF, wherein the transition frame comprises an immediate fade-in of the decoded audio streams for the plurality of content types for the later frame and an immediate fade-out of the decoded audio streams for the plurality of content types for the earlier frame.

9. The method of claim 7, wherein the IFFF comprises a first frame of a current packet and the earlier frame comprises a last frame of a previous packet.

10. The method of claim 9, wherein the IFFF further comprises an independent frame that is decoded into the decoded audio streams for the first frame of the current packet.

11. The method of claim 9, wherein the IFFF further comprises a predictive-coding frame and one or more previous frames that enable the IFFF to be decoded into the decoded audio streams for the first frame of the current packet, wherein the one or more previous frames start with an independent frame.

12. The method of claim 9, wherein for time-domain aliasing cancellation (TDAC) of modified discrete cosine transform (MDCT), the IFFF further comprises one or more previous frames that enable the IFFF to be decoded into the decoded audio streams for the first frame of the current packet, wherein the one or more previous frames start with an independent frame.

13. The method of claim 9, wherein the IFFF further comprises a plurality of frames of the current packet and a plurality of frames of the earlier packet to enable a plurality of transition frames when generating the crossfading of the decoded audio streams.

14. The method of claim 1, wherein generating the crossfading of the decoded audio streams in the two consecutive frames comprises:

performing a fade-in of the decoded audio streams for a later frame of the two consecutive frames and a fade-out of the decoded audio streams for an earlier frame of the two consecutive frames based on a windowing function associated with time-domain aliasing cancellation (TDAC) of modified discrete cosine transform (MDCT).

15. The method of claim 1, wherein generating the decoded audio streams comprises:

generating baseline decoded audio streams for the plurality of content types having at least one scene elements for each of the two consecutive frames, and wherein generating the crossfading of the decoded audio streams comprises:

generating crossfading of the baseline decoded audio streams for the plurality of content types from an earlier frame to a later frame of the two consecutive frames between transport channels;

generating spatially decoded audio streams of the crossfading of the baseline decoded audio streams for the plurality of content types;

rendering the spatially decoded audio streams for the plurality of content types to generate speaker output signals for the plurality of content types based on the speaker configuration of the decoding device; and mixing the speaker output signals for the plurality of content types to drive the plurality of speakers.

16. The method of claim 15, further comprising:

transmitting the spatially decoded audio streams of the crossfading of the baseline decoded audio streams for the plurality of content types and their time-synchronized metadata to a second device for rendering based on a speaker configuration of the second device.

17. The method of claim 15, wherein generating the crossfading of the baseline decoded audio streams for the plurality of content types from the earlier frame to the later frame of the two consecutive frames between transport channels comprises:

generating a transition frame based on an immediate fade-in and fade-out frame (IFFF), wherein the IFFF contains bit streams that encode the audio content of the later frame and encode the audio content of the earlier frame to enable an immediate fade-in of the baseline decoded audio streams for the plurality of content types for the later frame and an immediate fade-out of the baseline decoded audio streams for the plurality of content types for the earlier frame between the transport channels.

18. The method of claim 15, wherein generating the crossfading of the baseline decoded audio streams for the plurality of content types from the earlier frame to the later frame of the two consecutive frames between transport channels comprises:

performing a fade-in of the baseline decoded audio streams for the plurality of content types for the later frame and a fade-out of the baseline decoded audio streams for the plurality of content types for the earlier frame based on a windowing function associated with time-domain aliasing cancellation (TDAC) of modified discrete cosine transform (MDCT).

19. The method of claim 1, wherein the plurality of content types comprise audio channel, channel objects, or higher-order ambisonics (HOA), and wherein the adaptive number of scene elements in the plurality of content types comprise an adaptive number of channels, an adaptive number of channel objects, or an adaptive order of the HOA.

20. A system configured to decode audio content, the system comprising:

a memory configured to store instructions;

a processor coupled to the memory and configured to execute the instructions stored in the memory to:

receive frames of the audio content, the audio content being represented by a plurality of content types, the frames containing audio streams encoding the audio content using an adaptive number of scene elements in the plurality of content types;

process two consecutive frames containing the audio streams encoding the audio content using a different mixture of the adaptive number of the scene elements in the plurality of content types to generate decoded audio streams; and generate crossfading of the decoded audio streams in the two consecutive frames based on a speaker configuration to drive a plurality of speakers.

* * * * *